US012729299B2

(12) United States Patent
Gu

(10) Patent No.: US 12,729,299 B2
(45) Date of Patent: Sep. 8, 2026

(54) VIBRATION DAMPING THERMOPLASTIC ELASTOMER BLENDS

(71) Applicant: Avient Corporation, Avon Lake, OH (US)

(72) Inventor: Jiren Gu, Crystal Lake, IL (US)

(73) Assignee: AVIENT CORPORATION, Avon Lake, OH (US)

( * ) Notice: Subject to any disclaimer, the term of this patent is extended or adjusted under 35 U.S.C. 154(b) by 758 days.

(21) Appl. No.: 17/926,887

(22) PCT Filed: May 20, 2021

(86) PCT No.: PCT/US2021/033374
§ 371 (c)(1),
(2) Date: Nov. 21, 2022

(87) PCT Pub. No.: WO2021/236914
PCT Pub. Date: Nov. 25, 2021

(65) Prior Publication Data

US 2023/0235163 A1 Jul. 27, 2023

Related U.S. Application Data

(60) Provisional application No. 63/028,785, filed on May 22, 2020.

(51) Int. Cl.
*C08L 53/02* (2006.01)
*C08J 9/00* (2006.01)

(52) U.S. Cl.
CPC ............. *C08L 53/02* (2013.01); *C08J 9/0061* (2013.01); *C08J 2353/02* (2013.01); *C08L 2205/025* (2013.01); *C08L 2207/04* (2013.01)

(58) Field of Classification Search
CPC ... C08L 53/025; C08L 53/02; C08L 2205/025
See application file for complete search history.

(56) References Cited

U.S. PATENT DOCUMENTS 5,066,728 A 11/1991 Audett
5,472,782 A * 12/1995 Naritomi ............. B29C 66/7392 428/476.3
5,663,228 A 9/1997 Sasaki et al.
10,329,417 B2 6/2019 Gu
10,329,418 B2 6/2019 Gu
10,329,419 B2 6/2019 Gu
2009/0026934 A1* 1/2009 Fujita ....................... C09J 7/381 522/158
2009/0149567 A1* 6/2009 Lam ....................... C09J 153/00 525/90
2010/0189999 A1* 7/2010 Kimura ................... B32B 25/12 428/336
2010/0314813 A1* 12/2010 Wojtowicki ............ C08L 53/02 524/505
2011/0047819 A1* 3/2011 Pelletier .................. C08L 53/02 36/43
2013/0059937 A1* 3/2013 Bawiskar ................ C08L 91/00 521/146
2013/0101927 A1* 4/2013 Taneichi .............. C09J 153/025 430/5
2014/0004288 A1* 1/2014 Wakayama ................ C09J 7/22 428/521
2017/0014312 A1* 1/2017 Suzuki ..................... A61K 6/35
2018/0009573 A1* 1/2018 Glaser .................... B65D 33/00
2018/0215910 A1* 8/2018 Venkataswamy ....... C08L 53/00
2019/0283368 A1 9/2019 Danielson et al.
2019/0375931 A1 12/2019 Shetty et al.
2020/0001573 A1* 1/2020 Saito ....................... B32B 5/022
2020/0251082 A1* 8/2020 Smith ............... B32B 17/10743

FOREIGN PATENT DOCUMENTS

| | | | | |
|---|---|---|---|---|
| CN | 103314052 | A | | 9/2013 |
| CN | 107207829 | A | | 9/2017 |
| EP | 2190910 | B1 | | 2/2011 |
| EP | 2283100 | B1 | | 1/2012 |
| JP | 2004331707 | A | | 11/2004 |
| JP | 2006117744 | A | * | 5/2006 |
| JP | 5139861 | B2 | | 2/2013 |
| JP | 2019131795 | A | | 8/2019 |
| KR | 1020120108053 | A | | 10/2012 |
| WO | 2014194155 | A1 | | 12/2014 |
| WO | 2016130630 | A1 | | 8/2016 |
| WO | 2017055253 | A1 | | 4/2017 |
| WO | 2019089895 | A1 | | 5/2019 |
| WO | 2021236914 | A1 | | 11/2021 |

OTHER PUBLICATIONS

International Search and Written Opinion for PCT/US2021/033374 dated Sep. 2, 2021, 10 pages.

* cited by examiner

*Primary Examiner* — Mark S Kaucher
(74) *Attorney, Agent, or Firm* — Calfee, Halter & Griswold LLP

(57) ABSTRACT

Embodiments of the present disclosure are directed to thermoplastic elastomer blends comprising at least one non-hydrogenated styrene isoprene block copolymer (SIS) having a Weight Average Molecular Weight (Mw) greater than or equal to 50,000 g/mol and a Tan Delta Peak Temperature greater than or equal to 15° C. and less than or equal to 25° C. at least one of: at least one hydrogenated SIS having an Mw greater than or equal to 75,000 g/mol and a Tan Delta Peak Temperature less than or equal to 20° C.; and a styrene-ethylene/butylene-styrene block copolymer (SEBS) having a Mw greater than or equal to 75,000 g/mol and a Tan Delta Peak Temperature less than or equal to 20° C.; and a tackifier having a softening point greater than or equal to 80° C.

19 Claims, No Drawings

VIBRATION DAMPING THERMOPLASTIC ELASTOMER BLENDS

CLAIM OF PRIORITY

This application claims the benefit of U.S. Provisional Patent Application Ser. No. 63/028,785 and filed on May 22, 2020, which is hereby incorporated by reference in its entirety.

TECHNICAL FIELD

Embodiments of the present disclosure are generally related to thermoplastic elastomer blends, and are specifically related to vibration damping thermoplastic elastomer blends having improved damping properties and chemical resistance across a broad range of temperatures and vibrational frequencies.

BACKGROUND

Damping is the dissipation of mechanical energy from a system. Damping may be important in applications such as electronics, sound isolation, automotive and transportation, building and construction, household appliances, industrial equipment, firearms, healthcare and medical devices, personal and/or sports protection, and military transportation, equipment, and protective gear.

Thermoplastic elastomers (TPEs), which are polymer materials that exhibit elasticity while remaining thermoplastic, are conventionally used for damping applications. However, conventional TPEs and blends thereof do not have the desired damping properties at or above room temperature and exhibit poor chemical resistance.

Accordingly, a continual need exists for improved thermoplastic elastomer blends that provide enhanced damping and chemical resistance across a broad range of temperatures and vibrational frequencies.

SUMMARY

Embodiments of the present disclosure are directed to thermoplastic elastomer blends, which meet this need by exhibiting improved damping and chemical resistance across a broad range of temperatures, including at or above room temperature, and vibrational frequencies.

According to one embodiment, a thermoplastic elastomer blend is provided. The thermoplastic elastomer blend comprises at least one non-hydrogenated styrene isoprene block copolymer (SIS) having a Weight Average Molecular Weight (Mw) greater than or equal to 50,000 g/mol and a Tan Delta Peak Temperature greater than or equal to 15° C. and less than or equal to 25° C.; at least one of: at least one hydrogenated SIS having an Mw greater than or equal to 75,000 g/mol and a Tan Delta Peak Temperature less than or equal to 20° C.; and a styrene-ethylene/butylene-styrene block copolymer (SEBS) having a Mw greater than or equal to 75,000 g/mol and a Tan Delta Peak Temperature less than or equal to 20° C.; and a tackifier having a softening point greater than or equal to 80° C.

Additional features and advantages of the embodiments described herein will be set forth in the detailed description which follows, and in part will be readily apparent to those skilled in the art from that description or recognized by practicing the embodiments described herein, including the detailed description, which follows and the claims.

DETAILED DESCRIPTION

Reference will now be made in detail to various embodiments of thermoplastic elastomer blends that have improved damping properties and chemical resistance across a broad range of temperatures, including at or above room temperature, and vibrational frequencies. According to embodiments, a thermoplastic elastomer blend comprises at least one non-hydrogenated styrene isoprene block copolymer (SIS) having a Weight Average Molecular Weight (Mw) greater than or equal to 50,000 g/mol and a Tan Delta Peak Temperature greater than or equal to 15° C. and less than or equal to 25° C.; at least one of: at least one hydrogenated SIS having an Mw greater than or equal to 75,000 g/mol and a Tan Delta Peak Temperature less than or equal to 20° C.; and a styrene-ethylene/butylene-styrene block copolymer (SEBS) having a Mw greater than or equal to 75,000 g/mol and a Tan Delta Peak Temperature less than or equal to 20° C.; and a tackifier having a softening point greater than or equal to 80° C.

The disclosure should not be construed as limited to the embodiments set forth herein. Rather, these embodiments are provided so that this disclosure will be thorough and complete, and will fully convey the subject matter to those skilled in the art.

Definitions

Unless otherwise defined, all technical and scientific terms used herein have the same meaning as commonly understood by one of ordinary skill in the art. The terminology used in the disclosure herein is for describing particular embodiments only and is not intended to be limiting.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used in the specification and the appended claims, the singular forms "a," "an," and "the" are intended to include the plural forms as well, unless the context clearly indicates otherwise. Thus, for example, reference to "a" component includes aspects having two or more such components, unless the context clearly indicates otherwise.

The terms "0 wt. %," "free," and "substantially free," when used to describe the weight and/or absence of a particular component in a thermoplastic elastomer blend means that the component is not intentionally added to the thermoplastic elastomer blend. However, the thermoplastic elastomer blend may contain traces of the component as a contaminant or tramp in amounts of less than 0.05 wt. %.

All publications, patent applications, patents, and other references mentioned herein are expressly incorporated by reference in their entirety.

Weight Average Molecular Weight (Mw), as described herein, is measured using conventional gel permeation chromatography.

The term "parts by weight ('pbw')," as described herein, refers to pbw of the thermoplastic elastomer blend.

The term "wt. %," as described herein, refers to wt. % based on the weight of the thermoplastic elastomer blend.

The term "Shore A Hardness," as described herein, refers to the hardness of a material as measured in accordance with ASTM D2240.

The term "Tan Delta," as used herein, refers to the tangent of delta of a material and is the ratio of the material's loss modulus (E") to the material's storage modulus (E').

The term "Tan Delta Curve," as used herein, refers to a graphical depiction of Tan Delta of a material versus temperature.

The term "Tan Delta Peak," as used herein, refers to the prominent peak in a Tan Delta Curve for a material, as determined by dynamic mechanical analysis using TA Instruments Dynamic Mechanical Analysis Model Q800 in "shear sandwich" mode and for a temperature scan from −40° C. to 100° C. increasing at a rate of 5° C. per minute and with an oscillation frequency of 10 Hz.

The term "Tan Delta Peak Temperature," as used herein, refers to the temperature at which the Tan Delta Peak appears.

The term "Tan Delta Peak Height," as used herein, refers to the height of the Tan Delta Peak.

The term "Tan Delta Peak Width," as used herein, refers to the half width of the Tan Delta Peak.

The term "Tan Delta Peak Width Span," as used herein, refers to the temperatures between which the Tan Delta Peak Width spans.

The term "block copolymer," as use herein, refers to a polymer comprising molecules in which there is a linear arrangement of blocks, a block being defined as a portion of a polymer molecule in which the monomeric units have at least one constitutional or configurational features absent from the adjacent portions.

The term "soft block," as used herein, refers to a block of a block copolymer that has a glass transition temperature lower than the application temperature, such as less than or equal to −50° C.

The term "hard block," as used herein, refers to a block of a block copolymer that has a glass transition temperature equal to or higher than the application temperature, such as greater than or equal to 100° C.

The term "softening point," as used herein, refers to a material softening temperature as measured by a ring and ball type method according to ASTM 6493.

The term "high softening point tackifier," as used herein, refers to a tackifier having a softening point greater than or equal to 80° C. as measured according to ASTM 6493.

The term "vinyl," as used herein, when describing a styrenic block copolymer, refers to the vinyl content of the styrenic block copolymer prior to hydrogenation.

The term "high vinyl," as used herein, refers to a styrenic block copolymer having a vinyl content, prior to hydrogenation, greater than or equal to 50 mol. %.

The term "low vinyl," as used herein, refers to a styrenic block copolymer having a vinyl content, prior to hydrogenation, less than 50 mol. %.

The term "room temperature," as used herein, refers to 20° C.

TPEs, which are polymer materials that exhibit elasticity while remaining thermoplastic, are conventionally used for damping applications. TPEs may include styrenic block copolymers (SBC), thermoplastic vulcanizates (TPV), thermoplastic olefins (TPO), copolyesters (COPE), thermoplastic urethanes (TPU), copolyamides (COPA), and olefinic block copolymer (OBC).

SBCs, such as non-hydrogenated styrene isoprene block copolymers (SIS), are known to exhibit effective vibration damping properties at room temperature. For example, HYBRAR 5127 (Kuraray Co., Ltd.) has a Tan Delta Peak Temperature of 20° C. (i.e., room temperature). Therefore, non-hydrogenated SIS may be formulated into blends that exhibit effective room temperature damping. Moreover, the non-hydrogenated SIS may be cross-linked to improve the chemical resistance of the thermoplastic elastomer blend. However, non-hydrogenated SIS, such as HYBRAR 5127, may have a relatively low Mw (e.g., 127,000 g/mol). A low Mw, non-hydrogenated material may not withstand processing at temperatures above room temperature, which is required for some applications.

Hydrogenated materials, such as hydrogenated SIS and styrene-ethylene/butylene-styrene block copolymers (SEBS), may withstand processing temperatures above room temperature, but may not possess satisfactory damping properties at room temperature. For example, HYBRAR KL-7125 (Kuraray Co., Ltd.) has a Tan Delta Peak Temperature of −5° C. and HYBRAR KL-7135 (Kuraray Co., Ltd.) has a Tan Delta Peak Temperature of 1° C. KRATON G1641 and G1642 (Kraton Polymers) have a Tan Delta Peak of Temperature of −38° C.

Disclosed herein are thermoplastic elastomer blends which mitigate the aforementioned problems. Specifically, the thermoplastic elastomer blends disclosed herein comprise a blend of non-hydrogenated SIS and at least one of hydrogenated SIS and SEBS, which results in vibration damping thermoplastic elastomer blends having improved damping properties and chemical resistance across a broad range of temperatures and vibrational frequencies.

The thermoplastic elastomer blends disclosed herein may generally be described as comprising at least one non-hydrogenated SIS, at least one of at least one hydrogenated SIS and a SEBS, and a tackifier.

Non-Hydrogenated SIS

While not wishing to be bound by theory, it is believed that the Mw of the at least one non-hydrogenated SIS is too low for the non-hydrogenated SIS to withstand processing temperatures above room temperature without being combined with other polymers. In embodiments, the at least one non-hydrogenated SIS may have a Mw greater than or equal than or equal to 50,000 g/mol, greater than or equal to 75,000 g/mol, or even greater than or equal to 100,000 g/mol. In embodiments, the at least one non-hydrogenated SIS may have a Mw less than or equal to 300,000 g/mol, less than or equal to 200,000 g/mol, or even less than or equal to 150,000 g/mol. In embodiments, the at least one non-hydrogenated SIS may have a MW greater than or equal to 50,000 g/mol and less than or equal to 300,000 g/mol, greater than or equal to 50,000 g/mol and less than or equal to 200,000 g/mol, greater than or equal 50,000 g/mol and less than or equal to 150,000 g/mol, greater than or equal to 75,000 g/mol and less than or equal to 300,000 g/mol, greater than or equal to 75,000 g/mol and less than or equal to 200,000 g/mol, greater than or equal 75,000 g/mol and less than or equal to 150,000 g/mol, greater than or equal to 100,000 g/mol and less than or equal to 300,000 g/mol, greater than or equal to 100,000 g/mol and less than or equal to 200,000 g/mol, or even greater than or equal 100,000 g/mol and less than or equal to 150,000 g/mol, or any and all sub-ranges formed from any of these endpoints.

The at least one non-hydrogenated SIS is known to exhibit effective vibration damping properties at room temperature, as evidenced by its Tan Delta Peak Temperature. The capacity of a material for damping is related to its Tan Delta Peak Temperature. As the value of Tan Delta increases, the response of the material is relatively more viscous than it is elastic, and, thus, provides greater damping. In general, a material with a Tan Delta Peak Temperature that is relatively nearer to an application temperature, such as at or above room temperature, will possess better damping properties than a material with a Tan Delta Peak Temperature which is relatively lower or higher than the application temperature. In embodiments, the at least one non-hydrogenated SIS may have a Tan Delta Peak Temperature greater than or equal to 15° C., greater than or equal to 17° C., or even greater than or equal to 20° C. In embodiments, the at least one non-hydrogenated SIS may have a Tan Delta Peak Temperature less than or equal to 25° C. or even less than or equal to 23° C. In embodiments, the at least one non-hydrogenated SIS may have a Tan Delta Peak Temperature greater than or equal to 15° C. and less than or equal to 25° C., greater than or equal to 15° C. and less than or equal to 23° C., greater than or equal to 17° C. and less than or equal to 25° C., greater than or equal to 17° C. and less than or equal to 23° C., greater than or equal to 20° C. and less than or equal to 25° C., or even greater than or equal to 20° C. and less than or equal to 23° C., or any and all sub-ranges formed from any of these endpoints.

In embodiments, the at least one non-hydrogenated SIS may have a Tan Delta Peak Height greater than or equal to or equal to 0.8, greater than or equal to 0.85, greater than or equal to 0.9, greater than or equal to 0.95, greater than or equal to 1, or even greater than or equal to 1.05. In embodiments, the at least one non-hydrogenated SIS may have a Tan Delta Peak Height less than or equal to 1.25, less than or equal to 1.2, less than or equal to 1.15, or even less than or equal to 1.1. In embodiments, the at least one non-hydrogenated SIS may have a Tan Delta Peak Height greater than or equal to 0.8 and less than or equal to 1.25, greater than or equal to 0.8 and less than or equal to 1.2, greater than or equal to 0.8 and less than or equal to 1.15, greater than or equal to 0.8 and less than or equal to 1.1, greater than or equal to 0.85 and less than or equal to 1.25, greater than or equal to 0.85 and less than or equal to 1.2, greater than or equal to 0.85 and less than or equal to 1.15, greater than or equal to 0.85 and less than or equal to 1.1, greater than or equal to 0.9 and less than or equal to 1.25, greater than or equal to 0.9 and less than or equal to 1.2, greater than or equal to 0.9 and less than or equal to 1.15, greater than or equal to 0.9 and less than or equal to 1.1, greater than or equal to 0.95 and less than or equal to 1.25, greater than or equal to 0.95 and less than or equal to 1.2, greater than or equal to 0.7 and less than or equal to 1.15, greater than or equal to 0.95 and less than or equal to 1.1, greater than or equal to 1 and less than or equal to 1.25, greater than or equal to 1 and less than or equal to 1.2, greater than or equal to 1 and less than or equal to 1.15, greater than or equal to 1 and less than or equal to 1.1, greater than or equal to 1.05 and less than or equal to 1.25, greater than or equal to 1.05 and less than or equal to 1.2, greater than or equal to 1.05 and less than or equal to 1.15, or even greater than or equal to 1.05 and less than or equal to 1.1, or any and all sub-ranges formed from any of these endpoints.

In embodiments, the at least one non-hydrogenated SIS may have a Tan Delta Peak Width greater than or equal to 40° C., greater than or equal to 45° C., greater than or equal to 50° C., or even greater than or equal to 55° C. In embodiments the at least one non-hydrogenated SIS may have a Tan Delta Peak Width less than or equal to 100° C., less than or equal to 90° C., or even less than or equal to 80° C. In embodiments, the at least one non-hydrogenated SIS may have a Tan Delta Peak Width greater than or equal to 40° C. and less than or equal to 100° C., greater than or equal to 40° C. and less than or equal to 90° C., greater than or equal to 40° C. and less than or equal to 80° C., greater than or equal to 45° C. and less than or equal to 100° C., greater than or equal to 45° C. and less than or equal to 90° C., greater than or equal to 45° C. and less than or equal to 80° C., greater than or equal to 50° C. and less than or equal to 100° C., greater than or equal to 50° C. and less than or equal to 90° C., greater than or equal to 50° C. and less than or equal to 80° C., greater than or equal to 55° C. and less than or equal to 100° C., greater than or equal to 55° C. and less than or equal to 90° C., or even greater than or equal to 55° C. and less than or equal to 80° C., or any and all sub-ranges formed from any of these endpoints.

In embodiments, the at least one non-hydrogenated SIS may have a Shore A Hardness greater than or equal to 60 Shore A, greater than or equal to 70 Shore A or even greater than or equal to 80 Pa. In embodiments, the at least one non-hydrogenated SIS may have a Shore A hardness less than or equal to 100 Shore A or even less than or equal to 90 Pa. In embodiments, the at least one non-hydrogenated SIS may have a Shore A hardness greater than or equal to 60 Shore A and less than or equal to 100 Shore A, greater than or equal to 60 Shore A and less than or equal to 90 Shore A, greater than or equal to 70 Shore A and less than or equal to 100 Shore A, greater than or equal to 70 Shore A and less than or equal to 90 Shore A, greater than or equal to 80 Shore A and less than or equal to 100 Shore A or even greater than or equal to 80 Shore A and less than or equal to 90 Shore A, or any and all sub-ranges formed from any of these endpoints.

In embodiments, the amount of the at least one non-hydrogenated SIS in the thermoplastic elastomer blend is optimized to provide a thermoplastic elastomer blend having enhanced performance (e.g., damping properties and chemical resistance) at or above room temperature. In embodiments, the amount of the at least one non-hydrogenated SIS in the thermoplastic elastomer blend may be greater than or equal to 15 wt. %, greater than or equal to 20 wt. %, or even greater than or equal to 25 wt. %. In embodiments, the amount of the at least one non-hydrogenated SIS in the thermoplastic elastomer blend may be less than or equal to 75 wt. %, less than or equal to 70 wt. %, less than or equal to 65 wt. %, or even less than or equal to 60 wt. %. In embodiments, the amount of the at least one non-hydrogenated SIS in the thermoplastic elastomer blend may be greater than or equal to 15 wt. % and less than or equal to 75 wt. %, greater than or equal to 15 wt. % and less than or equal to 70 wt. %, greater than or equal to 15 wt. % and less than or equal to 65 wt. %, greater than or equal to 15 wt. % and less than or equal to 60 wt. %, greater than or equal to 20 wt. % and less than or equal to 75 wt. %, greater than or equal to 20 wt. % and less than or equal to 70 wt. %, greater than or equal to 20 wt. % and less than or equal to 65 wt. %, greater than or equal to 20 wt. % and less than or equal to 60 wt. %, greater than or equal to 25 wt. % and less than or equal to 75 wt. %, greater than or equal to 25 wt. % and less than or equal to 70 wt. %, greater than or equal to 25 wt. % and less than or equal to 65 wt. %, or even greater than or equal to 25 wt. % and less than or equal to 60 wt. %, or any and all sub-ranges formed from any of these endpoints.

In embodiments, the amount of the at least one non-hydrogenated SIS in the thermoplastic elastomer blend may be greater than or equal to 50 pbw, greater than or equal to 75 pbw, or even greater than or equal to 100 pbw. In embodiments, the amount of the at least one non-hydrogenated SIS in the thermoplastic elastomer blend may be less than or equal to 500 pbw, less than or equal to 450 pbw, less than or equal to 400 pbw, or even less than or equal to 350 pbw. In embodiments, the amount of the at least one non-hydrogenated SIS in the thermoplastic elastomer blend may be greater than or equal to 50 pbw and less than or equal to 500 pbw, greater than or equal to 50 pbw and less than or equal to 450 pbw, greater than or equal to 50 pbw and less than or equal to 400 pbw, greater than or equal to 50 pbw and less than or equal to 350 pbw, greater than or equal to 75 pbw and less than or equal to 500 pbw, greater than or equal to 75 pbw and less than or equal to 450 pbw, greater than or equal to 75 pbw and less than or equal to 400 pbw, greater than or equal to 75 pbw and less than or equal to 350 pbw, greater than or equal to 100 pbw and less than or equal to 500 pbw, greater than or equal to 100 pbw and less than or equal to 450 pbw, greater than or equal to 100 pbw and less than or equal to 400 pbw, or even greater than or equal to 100 pbw and less than or equal to 350 pbw, or any and all sub-ranges formed from any of these endpoints.

In embodiments, the at least one non-hydrogenated SIS is cross-linked. While not wishing to be bound by theory, it is believed that the at least one non-hydrogenated SIS cross-links with the at least one hydrogenated SIS and/or the SEBS. Crosslinking the copolymer forms tridimensional networks, which reduces the mobility of the structure and generally enhances it mechanical and chemical resistance properties.

Suitable commercial embodiments of the at least one non-hydrogenated SIS are available under the HYBRAR brand from Kuraray, Co. Ltd., such as grade 5127, along with any other suitable commercial embodiment.

Hydrogenated SIS

While not wishing to be bound by theory, it is believed that the relatively higher Mw of the at least one hydrogenated SIS allows the copolymer to withstand processing at temperatures above room temperature. In embodiments, the at least one hydrogenated SIS may have a Mw greater than or equal to 75,000 g/mol, greater than or equal to 100,000 g/mol, greater than or equal to 150,000 g/mol, or even greater than or equal to 200,000 g/mol. In embodiments, the at least one hydrogenated SIS may have a Mw less than or equal to $1\times10^6$ g/mol, less than or equal to 750,000 g/mol, or even less than or equal to 500,000 g/mol. In embodiments, the at least one hydrogenated SIS may have a Mw greater than or equal to 75,000 g/mol and less than or equal to $1\times10^6$ g/mol, greater than or equal to 75,000 g/mol and less than or equal to 750,000 g/mol, greater than or equal to 75,000 g/mol and less than or equal to 500,000 g/mol, greater than or equal to 100,000 g/mol and less than or equal to $1\times10^6$ g/mol, greater than or equal to 100,000 g/mol and less than or equal to 750,000 g/mol, greater than or equal to 100,000 g/mol and less than or equal to 500,000 g/mol, greater than or equal to 150,000 g/mol and less than or equal to $1\times10^6$ g/mol, greater than or equal to 150,000 g/mol and less than or equal to 750,000 g/mol, greater than or equal to 150,000 g/mol and less than or equal to 500,000 g/mol, greater than or equal to 200,000 g/mol and less than or equal to $1\times10^6$ g/mol, greater than or equal to 200,000 g/mol and less than or equal to 750,000 g/mol, or even greater than or equal to 200,000 g/mol and less than or equal to 500,000 g/mol, or any and all sub-ranges formed from any of these endpoints.

The at least one hydrogenated SIS has a relatively lower Tan Delta Peak Temperature as compared to the at least one non-hydrogenated SIS. In embodiments, the at least one hydrogenated SIS may have a Tan Delta Peak Temperature at or below room temperature, which is indicative of the poor damping properties of the at least one hydrogenated SIS at temperatures above room temperature. In embodiments, the at least one hydrogenated SIS may have a Tan Delta Peak Temperature greater than or equal to −10° C., greater than or equal to −5° C., or even greater than or equal to 0° C. In embodiments, the at least one hydrogenated SIS may have a Tan Delta Peak Temperature less than or equal to 20° C., less than or equal to 15° C., or even less than or equal to 10° C. In embodiments, the at least one hydrogenated SIS may have a Tan Delta Peak Temperature greater than or equal to −10° C. and less than or equal to 20° C., greater than or equal to −10° C. and less than or equal to 15° C., greater than or equal to −10° C. and less than or equal to 10° C., greater than or equal to −5° C. and less than or equal to 20° C., greater than or equal to −5° C. and less than or equal to 15° C., greater than or equal to −5° C. and less than or equal to 10° C., greater than or equal to 0° C. and less than or equal to 20° C., greater than or equal to 0° C. and less than or equal to 15° C., or even greater than or equal to 0° C. and less than or equal to 10° C., or any and all sub-ranges formed from any of these endpoints.

In embodiments, the at least one hydrogenated SIS may have a Tan Delta Peak Height greater than or equal to 0.75, greater than or equal to or equal to 0.8, greater than or equal to 0.85, greater than or equal to 0.9, or even greater than or equal to 0.95. In embodiments, the at least one hydrogenated SIS may have a Tan Delta Peak Height less than or equal to 1.2, less than or equal to 1.15, less than or equal to 1.1, or even less than or equal to 1. In embodiments, the at least one hydrogenated SIS may have a Tan Delta Peak Height greater than or equal to 0.75 and less than or equal to 1.2, greater than or equal to 0.75 and less than or equal to 1.15, greater than or equal to 0.75 and less than or equal to 1.1, greater than or equal to 0.75 and less than or equal to 1.05, greater than or equal to 0.75 and less than or equal to 1, greater than or equal to 0.8 and less than or equal to 1.2, greater than or equal to 0.8 and less than or equal to 1.15, greater than or equal to 0.8 and less than or equal to 1.1, greater than or equal to 0.8 and less than or equal to 1.05, greater than or equal to 0.8 and less than or equal to 1, greater than or equal to 0.85 and less than or equal to 1.2, greater than or equal to 0.85 and less than or equal to 1.15, greater than or equal to 0.85 and less than or equal to 1.1, greater than or equal to 0.85 and less than or equal to 1.05, greater than or equal to 0.85 and less than or equal to 1, greater than or equal to 0.9 and less than or equal to 1.2, greater than or equal to 0.9 and less than or equal to 1.15, greater than or equal to 0.9 and less than or equal to 1.1, greater than or equal to 0.9 and less than or equal to 1.05, greater than or equal to 0.9 and less than or equal to 1, greater than or equal to 0.95 and less than or equal to 1.2, greater than or equal to 0.95 and less than or equal to 1.15, greater than or equal to 0.95 and less than or equal to 1.1, greater than or equal to 0.95 and less than or equal to 1.05, or even greater than or equal to 0.95 and less than or equal to 1, or any and all sub-ranges formed from any of these endpoints.

In embodiments, the at least one hydrogenated SIS may have a Tan Delta Peak Width greater than or equal to 40° C., greater than or equal to 45° C., greater than or equal to 50° C., or even greater than or equal to 55° C. In embodiments the at least one hydrogenated SIS may have a Tan Delta Peak Width less than or equal to 100° C., less than or equal to 90° C., or even less than or equal to 80° C. In embodiments, the at least one hydrogenated SIS may have a Tan Delta Peak Width greater than or equal to 40° C. and less than or equal to 100° C., greater than or equal to 40° C. and less than or equal to 90° C., greater than or equal to 40° C. and less than or equal to 80° C., greater than or equal to 45° C. and less than or equal to 100° C., greater than or equal to 45° C. and less than or equal to 90° C., greater than or equal to 45° C. and less than or equal to 80° C., greater than or equal to 50° C. and less than or equal to 100° C., greater than or equal to 50° C. and less than or equal to 90° C., greater than or equal to 50° C. and less than or equal to 80° C., greater than or equal to 55° C. and less than or equal to 100° C., greater than or equal to 55° C. and less than or equal to 90° C., or even greater than or equal to 55° C. and less than or equal to 80° C., or any and all sub-ranges formed from any of these endpoints.

In embodiments, the at least one hydrogenated SIS may have a Shore A Hardness greater than or equal to 40 Shore A, greater than or equal to 50 Shore A, or even greater than or equal to 60 Pa. In embodiments, the at least one hydrogenated SIS may have a Shore A hardness less than or equal to 100 Shore A, less than or equal to 90 Shore A, or even less than or equal to 80 Pa. In embodiments, the at least one hydrogenated SIS may have a Shore A hardness greater than or equal to 40 Shore A and less than or equal to 100 Shore A, greater than or equal to 40 Shore A and less than or equal to 90 Shore A, greater than or equal to 40 Shore A and less than or equal to 80 Shore A, greater than or equal to 50 Shore A and less than or equal to 100 Shore A, greater than or equal to 50 Shore A and less than or equal to 90 Shore A, or even greater than or equal to 50 Shore A and less than or equal to 80 Shore A, greater than or equal to 60 Shore A and less than or equal to 100 Shore A, greater than or equal to 60 Shore A and less than or equal to 90 Shore A, or even greater than or equal to 60 Shore A and less than or equal to 80 Shore A, or any and all sub-ranges formed from any of these endpoints.

In embodiments, the amount of the at least one hydrogenated SIS in the thermoplastic blend is optimized such that the thermoplastic elastomer blend may withstand processing at higher processing temperatures. In embodiments, the amount of the at least one hydrogenated SIS in the thermoplastic elastomer blend may be greater than or equal to 5 wt. %, greater than or equal to 10 wt. %, or even greater than or equal to 15 wt. %. In embodiments, the amount of the at least one hydrogenated SIS in the thermoplastic elastomer blend may be less than or equal to 50 wt. %, less than or equal to 40 wt. %, less than or equal to 30 wt. %, or even less than or equal to 25 wt. %. In embodiments, the amount of the at least one hydrogenated SIS in the thermoplastic elastomer blend may be greater than or equal to 5 wt. % and less than or equal to 50 wt. %, greater than or equal to 5 wt. % and less than or equal to 40 wt. %, greater than or equal to 5 wt. % and less than or equal to 30 wt. %, greater than or equal to 5 wt. % and less than or equal to 25 wt. %, greater than or equal to 10 wt. % and less than or equal to 50 wt. %, greater than or equal to 10 wt. % and less than or equal to 40 wt. %, greater than or equal to 10 wt. % and less than or equal to 30 wt. %, greater than or equal to 10 wt. % and less than or equal to 25 wt. %, greater than or equal to 15 wt. % and less than or equal to 50 wt. %, greater than or equal to 15 wt. % and less than or equal to 40 wt. %, greater than or equal to 15 wt. % and less than or equal to 30 wt. %, or even greater than or equal to 15 wt. % and less than or equal to 25 wt. %, or any and all sub-ranges formed from any of these endpoints.

In embodiments, the amount of the at least one hydrogenated SIS in the thermoplastic elastomer blend may be greater than or equal to 25 pbw, greater than or equal to 35 pbw, or even greater than or equal to 45 pbw. In embodiments, the amount of the at least one hydrogenated SIS in the thermoplastic elastomer blend may be less than or equal to 250 pbw, less than or equal to 200 pbw, less than or equal to 150 pbw, or even less than or equal to 125 pbw. In embodiments, the amount of the at least one hydrogenated SIS in the thermoplastic elastomer blend may be greater than or equal to 25 pbw and less than or equal to 250 pbw, greater than or equal to 25 pbw and less than or equal to 200 pbw, greater than or equal to 25 pbw and less than or equal to 150 pbw, greater than or equal to 25 pbw and less than or equal to 125 pbw, greater than or equal to 35 pbw and less than or equal to 250 pbw, greater than or equal to 35 pbw and less than or equal to 200 pbw, greater than or equal to 35 pbw and less than or equal to 150 pbw, greater than or equal to 35 pbw and less than or equal to 125 pbw, greater than or equal to 45 pbw and less than or equal to 250 pbw, greater than or equal to 45 pbw and less than or equal to 200 pbw, greater than or equal to 45 pbw and less than or equal to 150 pbw, or even greater than or equal to 45 pbw and less than or equal to 125 pbw, or any and all sub-ranges formed from any and all of these endpoints.

In embodiments, the at least one hydrogenated SIS may comprise a polyisoprene soft block. In embodiments, the polyisoprene soft block may be a vinyl-polyisoprene soft block.

Suitable commercial embodiments of the at least one hydrogenated SIS are available under the HYBRAR brand from Kuraray, Co. Ltd., such as grades KL-7125 and KL-7135, along with any other suitable commercial embodiment.

Styrene-Ethylene/Butylene-Styrene Block Copolymer (SEBS)

While not wishing to be bound by theory, it is believed that the relatively higher Mw of the SEBS allows the copolymer to withstand processing at temperatures above room temperature. In embodiments, the SEBS may have a Mw greater than or equal to 75,000 g/mol, greater than or equal to 100,000 g/mol, greater than or equal to 150,000 g/mol, or even greater than or equal to 200,000 g/mol. In embodiments, the SEBS may have a Mw less than or equal to 750,000 g/mol, less than or equal to 500,000 g/mol, or even less than or equal to 300,000 g/mol. In embodiments, the SEBS may have a Mw greater than or equal to 75,000 g/mol and less than or equal to 750,000 g/mol, greater than or equal to 75,000 g/mol and less than or equal to 500,000 g/mol, greater than or equal to 75,000 g/mol and less than or equal to 300,000 g/mol, greater than or equal to 100,000 g/mol and less than or equal to 750,000 g/mol, greater than or equal to 100,000 g/mol and less than or equal to 500,000 g/mol, greater than or equal to 100,000 g/mol and less than or equal to 300,000 g/mol, greater than or equal to 150,000 g/mol and less than or equal to 750,000 g/mol, greater than or equal to 150,000 g/mol and less than or equal to 500,000 g/mol, greater than or equal to 150,000 g/mol and less than or equal to 300,000 g/mol, greater than or equal to 200,000 g/mol and less than or equal to 750,000 g/mol, greater than or equal to 200,000 g/mol and less than or equal to 500,000 g/mol, or even greater than or equal to 200,000 g/mol and less than or equal to 300,000 g/mol, or any and all sub-ranges formed from any of these endpoints.

The SEBS has a relatively lower Tan Delta Peak Temperature as compared to the at least one non-hydrogenated SIS. In embodiments, the SEBS may have a Tan Delta Peak Temperature greater than or equal to −50° C., greater than or equal to −25° C., greater than or equal to −10° C., greater than or equal to −5° C., or even greater than or equal to 0° C. In embodiments, the SEBS may have a Tan Delta Peak Temperature less than or equal to 20° C., less than or equal to 15° C., or even less than or equal to 10° C. In embodiments, the SEBS may have a Tan Delta Peak Temperature greater than or equal to −50° C. and less than or equal to 20° C., greater than or equal to −50° C. and less than or equal to 15° C., greater than or equal to −50° C. and less than or equal to 10° C., greater than or equal to −25° C. and less than or equal to 20° C., greater than or equal to −25° C. and less than or equal to 15° C., greater than or equal to −25° C. and less than or equal to 10° C., greater than or equal to −10° C. and less than or equal to 20° C., greater than or equal to −10° C. and less than or equal to 15° C., greater than or equal to −10° C. and less than or equal to 10° C., greater than or equal to −5° C. and less than or equal to 20° C., greater than or equal to −5° C. and less than or equal to 15° C., greater than or equal to −5° C. and less than or equal to 10° C., greater than or equal to 0° C. and less than or equal to 20° C., greater than or equal to 0° C. and less than or equal to 15° C., or even greater than or equal to 0° C. and less than or equal to 10° C., or any and all sub-ranges formed from any of these endpoints.

In embodiments, the SEBS may have a Tan Delta Peak Height greater than or equal to 0.55, greater than or equal to 0.6, greater than or equal to 0.65, greater than or equal to 0.7, greater than or equal to 0.75, or even greater than or equal to 0.8. In embodiments, the SEBS may have a Tan Delta Peak Height less than or equal to 1, less than or equal to 0.95, or even less than or equal to 0.9. In embodiments, the SEBS may have a Tan Delta Peak Height greater than or equal to 0.55 and less than or equal to 1, greater than or equal to 0.55 and less than or equal to 0.95, greater than or equal to 0.55 and less than or equal to 0.9, greater than or equal to 0.6 and less than or equal to 1, greater than or equal to 0.6 and less than or equal to 0.95, greater than or equal to 0.6 and less than or equal to 0.9, greater than or equal to 0.65 and less than or equal to 1, greater than or equal to 0.65 and less than or equal to 0.95, greater than or equal to 0.65 and less than or equal to 0.9, greater than or equal to 0.7 and less than or equal to 1, greater than or equal to 0.7 and less than or equal to 0.95, greater than or equal to 0.7 and less than or equal to 0.9, greater than or equal to 0.75 and less than or equal to 1, greater than or equal to 0.75 and less than or equal to 0.95, greater than or equal to 0.75 and less than or equal to 0.9, greater than or equal to 0.8 and less than or equal to 1, greater than or equal to 0.8 and less than or equal to 0.95, or even greater than or equal to 0.8 and less than or equal to 0.9, or any and all sub-ranges formed from any of these endpoints.

In embodiments, the SEBS may have a Tan Delta Peak Width greater than or equal to 40° C., greater than or equal to 45° C., greater than or equal to 50° C., or even greater than or equal to 55° C. In embodiments the SEBS may have a Tan Delta Peak Width less than or equal to 100° C., less than or equal to 90° C., or even less than or equal to 80° C. In embodiments, the SEBS may have a Tan Delta Peak Width greater than or equal to 40° C. and less than or equal to 100° C., greater than or equal to 40° C. and less than or equal to 90° C., greater than or equal to 40° C. and less than or equal to 80° C., greater than or equal to 45° C. and less than or equal to 100° C., greater than or equal to 45° C. and less than or equal to 90° C., greater than or equal to 45° C. and less than or equal to 80° C., greater than or equal to 50° C. and less than or equal to 100° C., greater than or equal to 50° C. and less than or equal to 90° C., greater than or equal to 50° C. and less than or equal to 80° C., greater than or equal to 55° C. and less than or equal to 100° C., greater than or equal to 55° C. and less than or equal to 90° C., or even greater than or equal to 55° C. and less than or equal to 80° C., or any and all sub-ranges formed from any of these endpoints.

In embodiments, the SEBS may have a Shore A Hardness greater than or equal to 20 Shore A, greater than or equal to 30 Shore A, or even greater than or equal to 40 Shore A. In embodiments, the SEBS may have a Shore A hardness less than or equal to 70 Shore A or even less than or equal to 60 Shore A. In embodiments, the SEBS may have a Shore A Hardness greater than or equal to 20 Shore A and less than or equal to 70 Shore A, greater than or equal to 20 Shore A and less than or equal to 60 Shore A, greater than or equal to 30 Shore A and less than or equal to 70 Shore A, greater than or equal to 30 Shore A and less than or equal to 60 Shore A, greater than or equal to 40 Shore A and less than or equal to 70 Shore A, or even greater than or equal to 40 Shore A and less than or equal to 60 Shore A, or any and all sub-ranges formed from any of these endpoints.

In embodiments, the amount of SEBS in the thermoplastic elastomer blend may be greater than or equal to 1 wt. %, greater than or equal to 3 wt. %, or even greater than or equal to 5 wt. %. In embodiments, the amount of SEBS in the thermoplastic elastomer blend may be less than or equal to 20 wt. %, less than or equal to 17 wt. %, or even less than or equal to 15 wt. %. In embodiments, the amount of SEBS in the thermoplastic elastomer blend may be greater than or equal to 1 wt. % and less than or equal to 20 wt. %, greater than or equal to 1 wt. % and less than or equal to 17 wt. %, greater than or equal to 1 wt. % and less than or equal to 15 wt. %, greater than or equal to 3 wt. % and less than or equal to 20 wt. %, greater than or equal to 3 wt. % and less than or equal to 17 wt. %, greater than or equal to 3 wt. % and less than or equal to 15 wt. %, greater than or equal to 5 wt. % and less than or equal to 20 wt. %, greater than or equal to 5 wt. % and less than or equal to 17 wt. %, or even greater than or equal to 5 wt. % and less than or equal to 15 wt. %, or any and all sub-ranges formed from any of these endpoints.

In embodiments, the amount of the SEBS in the thermoplastic elastomer blend may be greater than or equal to 10 pbw, greater than or equal to 20 pbw, or even greater than or equal to 25 pbw. In embodiments, the amount of the SEBS in the thermoplastic elastomer blend may be less than or equal to 75 pbw or even less than or equal to 50 pbw. In embodiments, the amount of the SEBS in the thermoplastic elastomer blend may be greater than or equal to 10 pbw and less than or equal to 75 pbw, greater than or equal to 10 pbw and less than or equal to 50 pbw, greater than or equal to 20 pbw and less than or equal to 75 pbw, greater than or equal to 20 pbw and less than or equal to 50 pbw, greater than or equal to 25 pbw and less than or equal to 75 pbw, or even greater than or equal to 25 pbw and less than or equal to 50 pbw, or any and all sub-ranges formed from any of these endpoints.

Suitable commercial embodiments of the SEBS are available under the KRATON G brand from Kraton Polymers, such as grades G1641 and G1642, along with any other suitable commercial embodiment.

Tackifier

While not wishing to be bound by theory, it is believed that the addition of a high softening point tackifier to the thermoplastic elastomer blend shifts the Tan Delta Peak Temperature to a higher temperature.

In embodiments, the tackifier may have a softening point greater than or equal to 80° C., greater than or equal to 100° C., greater than or equal to 120° C., or even greater than or equal to 140° C. In embodiments, the tackifier may have a softening point of less than or equal to 200° C., less than or equal to 175° C., or even less than or equal to 150° C. In embodiments, the tackifier may have a softening point of greater than or equal to 80° C. and less than or equal to 200° C., greater than or equal to 80° C. and less than or equal to 175° C., greater than or equal to 80° C. and less than or equal to 150° C., greater than or equal to 100° C. and less than or equal to 200° C., greater than or equal to 100° C. and less than or equal to 175° C., greater than or equal to 100° C. and less than or equal to 150° C., greater than or equal to 120° C. and less than or equal to 200° C., greater than or equal to 120° C. and less than or equal to 175° C., greater than or equal to 120° C. and less than or equal to 150° C., greater than or equal to 140° C. and less than or equal to 200° C., greater than or equal to 140° C. and less than or equal to 175° C., or even greater than or equal to 140° C. and less than or equal to 150° C., or any and all sub-ranges formed from any of these endpoints.

In embodiments, the amount of tackifier in the thermoplastic elastomer blend may be greater than or equal to 1 wt. %, greater than or equal to 5 wt. %, or even greater than or equal to 10 wt. %. In embodiments, the amount of tackifier in the thermoplastic elastomer blend may be less than or equal to 40 wt. %, less than or equal to 35 wt. %, or even less than or equal to 30 wt. %. In embodiments, the amount of tackifier in the thermoplastic elastomer blend may be greater than or equal to 1 wt. % and less than or equal to 40 wt. %, greater than or equal to 1 wt. % and less than or equal to 35 wt. %, greater than or equal to 1 wt. % and less than or equal to 30 wt. %, greater than or equal to 5 wt. % and less than or equal to 40 wt. %, greater than or equal to 5 wt. % and less than or equal to 35 wt. %, greater than or equal to 5 wt. % and less than or equal to 30 wt. %, greater than or equal to 10 wt. % and less than or equal to 40 wt. %, greater than or equal to 10 wt. % and less than or equal to 35 wt. %, or even greater than or equal to 10 wt. % and less than or equal to 30 wt. %, or any and all sub-ranges formed from any of these endpoints.

In embodiments, the amount of tackifier in the thermoplastic elastomer blend may be greater than or equal to 20 pbw, greater than or equal to 40 pbw, or even greater than 50 pbw. In embodiments, the amount of tackifier in the thermoplastic elastomer blend may be less than or equal to 200 pbw, less than or equal to 150 pbw, or even less than 125 pbw. In embodiments, the amount of tackifier in the thermoplastic elastomer blend may be greater than or equal to 20 pbw and less than or equal to 200 pbw, greater than or equal to 20 pbw and less than or equal to 150 pbw, greater than or equal to 20 pbw and less than or equal to 125 pbw, greater than or equal to 40 pbw and less than or equal to 200 pbw, greater than or equal to 40 pbw and less than or equal to 150 pbw, greater than or equal to 40 pbw and less than or equal to 125 pbw, greater than or equal to 50 pbw and less than or equal to 200 pbw, greater than or equal to 50 pbw and less than or equal to 150 pbw, or even greater than or equal to 50 pbw and less than or equal to 125 pbw, or any and all sub-ranges formed from any of these endpoints.

In embodiments, the tackifier may have a Mw greater than or equal to 400 g/mol, greater than or equal to 600 g/mol, greater than or equal to 800 g/mol, or even greater than or equal to 1000 g/mol. In embodiments, the tackifier may have a Mw less than or equal to 3,500 g/mol, less than or equal to 3,000 g/mol, less than or equal to 2,500 g/mol, or even less than or equal to 2,000 g/mol. In embodiments, the tackifier may have a Mw greater than or equal to 400 g/mol and less than or equal to 3,500 g/mol, greater than or equal to 400 g/mol and less than or equal to 3,000 g/mol, greater than or equal to 400 g/mol and less than or equal to 2,500 g/mol, greater than or equal to 400 g/mol and less than or equal to 2,000 g/mol, greater than or equal to 600 g/mol and less than or equal to 3,500 g/mol, greater than or equal to 600 g/mol and less than or equal to 3,000 g/mol, greater than or equal to 600 g/mol and less than or equal to 2,500 g/mol, greater than or equal to 600 g/mol and less than or equal to 2,000 g/mol, greater than or equal to 800 g/mol and less than or equal to 3,500 g/mol, greater than or equal to 800 g/mol and less than or equal to 3,000 g/mol, greater than or equal to 800 g/mol and less than or equal to 2,500 g/mol, greater than or equal to 800 g/mol and less than or equal to 2,000 g/mol, greater than or equal to 1,000 g/mol and less than or equal to 3,500 g/mol, greater than or equal to 1,000 g/mol and less than or equal to 3,000 g/mol, greater than or equal to 1,000 g/mol and less than or equal to 2,500 g/mol, or even greater than or equal to 1,000 g/mol and less than or equal to 2,000 g/mol, or any and all sub-ranges formed from any of these endpoints.

In embodiments, the tackifier may be derived from rosin feedstock, terpene feedstock, hydrocarbon feedstock, or combinations thereof. In embodiments, the tackifier may be a hydrocarbon-based tackifier. In embodiments, the hydrocarbon-based tackifier may be aliphatic or aromatic and saturated or unsaturated.

Suitable commercial embodiments of the tackifier are available under the ARKON brand from Arakawa Chemical Industries, Ltd., such as grades P100, P115, P125, and P140; under the EASTOTAC brand from Eastman Chemical Company, such as grades H-125-W, H-140-W, and H-142-W; under the PLASTOLYN brand from Eastman Chemical Company, such as grade R1140; and under the REGALREZ brand from Eastman Chemical Company, such as grade 1130, along with any other suitable commercial embodiment.

The thermoplastic elastomer blends described herein are different from adhesive compositions at least because adhesive compositions typically are relatively low viscosity compositions that do not possess the useful mechanical properties of TPEs. Accordingly, the thermoplastic elastomer blends described herein are not adhesive compositions. For example, the thermoplastic elastomer blends described herein are not tacky, or are not sticky to the touch of a human hand.

Thermoplastic Elastomer Blend

As discussed hereinabove, non-hydrogenated SIS has effective vibration damping properties at room temperature, which is evidenced by its Tan Delta Peak Temperature. Non-hydrogenated SIS is added to the thermoplastic elastomer blend to increase the Tan Delta Peak Temperature of the thermoplastic elastomer blend. In embodiments, the thermoplastic elastomer blend may have a Tan Delta Peak Temperature greater than or equal to 20° C., greater than or equal to 25° C., or even greater than or equal to 30° C. In embodiments, the thermoplastic elastomer blend may have a Tan Delta Peak Temperature less than or equal to 75° C., less than or equal to 70° C., or even less than or equal to 65° C. In embodiments, the thermoplastic elastomer blend may have a Tan Delta Peak Temperature greater than or equal to 20° C. and less than or equal to 75° C., greater than or equal to 20° C. and less than or equal to 70° C., greater than or equal to 20° C. and less than or equal to 65° C., greater than or equal to 25° C. and less than or equal to 75° C., greater than or equal to 25° C. and less than or equal to 70° C., greater than or equal to 25° C. and less than or equal to 65° C., greater than or equal to 30° C. and less than or equal to 75° C., greater than or equal to 30° C. and less than or equal to 70° C., or even greater than or equal to 30° C. and less than or equal to 65° C., or any and all sub-ranges formed from any of these endpoints.

The capacity of a material for damping is also related to its Tan Delta Peak Height. A higher Tan Delta Peak Height for a material indicates an increased damping capacity. In embodiments, the thermoplastic elastomer blend may have a Tan Delta Peak Height greater than or equal to 0.55, greater than or equal to 0.6, greater than or equal to 0.65, or even greater than 0.7. In embodiments, the thermoplastic elastomer blend may have a Tan Delta Peak Height less than or equal to 1.1, less than or equal to 1.05, less than or equal to 1, or even less than or equal to 0.95. In embodiments, the thermoplastic elastomer blend may have a Tan Delta Peak Height greater than or equal to 0.55 and less than or equal to 1.1, greater than or equal to 0.55 and less than or equal to 1.05, greater than or equal to 0.55 and less than or equal to 1, greater than or equal to 0.55 and less than or equal to 0.95, greater than or equal to 0.6 and less than or equal to 1.1, greater than or equal to 0.6 and less than or equal to 1.05, greater than or equal to 0.6 and less than or equal to 1, greater than or equal to 0.6 and less than or equal to 0.95, greater than or equal to 0.65 and less than or equal to 1.1, greater than or equal to 0.65 and less than or equal to 1.05, greater than or equal to 0.65 and less than or equal to 1, greater than or equal to 0.65 and less than or equal to 0.95, greater than or equal to 0.7 and less than or equal to 1.1, greater than or equal to 0.7 and less than or equal to 1.05, greater than or equal to 0.7 and less than or equal to 1, or even greater than or equal to 0.7 and less than or equal to 0.95, or any and all sub-ranges formed from any of these endpoints.

The capacity of a material for damping is also related to its Tan Delta Peak Width. A broader Tan Delta Peak Width for a material indicates an increased damping capacity. In embodiments, the thermoplastic elastomer blend may have a Tan Delta Peak Width greater than or equal to 55° C., greater than or equal to 60° C., or even greater than or equal to 65° C. In embodiments the thermoplastic elastomer blend may have a Tan Delta Peak Width less than or equal to 100° C., less than or equal to 90° C., or even less than or equal to 80° C. In embodiments, the thermoplastic elastomer blend may have a Tan Delta Peak Width greater than or equal to 55° C. and less than or equal to 100° C., greater than or equal to 55° C. and less than or equal to 90° C., greater than or equal to 55° C. and less than or equal to 80° C., greater than or equal to 60° C. and less than or equal to 100° C., greater than or equal to 60° C. and less than or equal to 90° C., greater than or equal to 60° C. and less than or equal to 80° C., greater than or equal to 65° C. and less than or equal to 100° C., greater than or equal to 65° C. and less than or equal to 90° C., or even greater than or equal to 65° C. and less than or equal to 80° C., or any and all sub-ranges formed from any of these endpoints.

In embodiments, the thermoplastic elastomer blend may have a Shore A hardness greater than or equal to 15 Shore A, greater than or equal to 20 Shore A, or even greater than or equal to 25 Pa. In embodiments, the thermoplastic elastomer blend may have a Shore A hardness less than or equal to 50 Shore A, less than or equal to 45 Shore A, or even less than or equal to 40 Pa. In embodiments, the thermoplastic elastomer blend may have a Shore A hardness greater than or equal to 15 Shore A and less than or equal to 50 Shore A, greater than or equal to 15 Shore A, and less than or equal to 45 Shore A, greater than or equal to 15 Shore A and less than or equal to 40 Shore A, greater than or equal to 20 Shore A and less than or equal to 50 Shore A, greater than or equal to 20 Shore A and less than or equal to 45 Shore A, greater than or equal to 20 Shore A and less than or equal to 40 Shore A, greater than or equal to 25 Shore A and less than or equal to 50 Shore A, greater than or equal to 25 Shore A and less than or equal to 45 Shore A, or even greater than or equal to 25 Shore A and less than or equal to 40 Shore A, or any and all sub-ranges formed from any of these endpoints.

While not wishing to be bound by theory, it is believed that the ratio of hydrogenated SIS to non-hydrogenated SIS or SEBS in the thermoplastic elastomer blend must be optimized to obtain the improved damping properties and chemical resistance across a broad range of temperatures and vibrational frequencies. Hydrogenated SIS or SEBS is added to increase the processability of the thermoplastic elastomer blend at higher application temperatures, but having the desired damping properties requires the addition of a greater amount of non-hydrogenated SIS. In embodiments, the ratio by weight of the thermoplastic elastomer blend of the non-hydrogenated SIS to the hydrogenated SIS may be from 1:1 to 4:1, from 1:1 to 3.5:1, from 1.5:1 to 4:1, or even from 1.5:1 to 4:1, or any and all sub-ranges formed from any of these endpoints. In embodiments, the ratio by weight of the thermoplastic elastomer blend of the non-hydrogenated SIS to SEBS may be from 1:1 to 4:1, from 1:1 to 3.5:1, from 1.5:1 to 4:1, or even from 1.5:1 to 4:1, or any and all sub-ranges formed from any of these endpoints.

Styrene-Isobutylene Block Copolymer (SIBS)

In embodiments, the thermoplastic elastomer blend may further comprise a SIBS. While not wishing to be bound by theory, it is believed adding the SIBS to the thermoplastic elastomer blend may increase the Tan Delta Peak Width of the thermoplastic elastomer blend.

In embodiments, the SIBS may have a Mw greater than or equal to 50,000 g/mol, greater than or equal to 75,000 g/mol, or even greater than or equal to 100,000 g/mol. In embodiments, the SIBS may have a Mw less than or equal to 300,000 g/mol, less than or equal to 200,000 g/mol, or even less than or equal to 150,000 g/mol. In embodiments, the SIBS may have a MW greater than or equal to 50,000 g/mol and less than or equal to 300,000 g/mol, greater than or equal to 50,000 g/mol and less than or equal to 200,000 g/mol, greater than or equal 50,000 g/mol and less than or equal to 150,000 g/mol, greater than or equal to 75,000 g/mol and less than or equal to 300,000 g/mol, greater than or equal to 75,000 g/mol and less than or equal to 200,000 g/mol, greater than or equal 75,000 g/mol and less than or equal to 150,000 g/mol, greater than or equal to 100,000 g/mol and less than or equal to 300,000 g/mol, greater than or equal to 100,000 g/mol and less than or equal to 200,000 g/mol, or even greater than or equal 100,000 g/mol and less than or equal to 150,000 g/mol, or any and all sub-ranges formed from any of these endpoints.

In embodiments, the SIBS may have a Tan Delta Peak Temperature greater than or equal to −10° C., greater than or equal to −5° C., or even greater than or equal to 0° C. In embodiments, the SIBS may have a Tan Delta Peak Temperature less than or equal to 20° C., less than or equal to 15° C., or even less than or equal to 10° C. In embodiments, the SIBS may have a Tan Delta Peak Temperature greater than or equal to −10° C. and less than or equal to 20° C., greater than or equal to −10° C. and less than or equal to 15° C., greater than or equal to −10° C. and less than or equal to 10° C., greater than or equal to −5° C. and less than or equal to 20° C., greater than or equal to −5° C. and less than or equal to 15° C., greater than or equal to −5° C. and less than or equal to 10° C., greater than or equal to 0° C. and less than or equal to 20° C., greater than or equal to 0° C. and less than or equal to 15° C., or even greater than or equal to 0° C. and less than or equal to 10° C., or any and all sub-ranges formed from any of these endpoints.

In embodiments, the SIBS may have a Tan Delta Peak Height greater than or equal to 0.65, greater than or equal to 0.7, greater than or equal to 0.75, or even greater than or equal to 0.8. In embodiments, the SIBS may have a Tan Delta Peak Height less than or equal to 1, less than or equal to 0.95, or even less than or equal to 0.9. In embodiments, the SIBS may have a Tan Delta Peak Height greater than or equal to 0.65 and less than or equal to 1, greater than or equal to 0.65 and less than or equal to 0.95, greater than or equal to 0.65 and less than or equal to 0.9, greater than or equal to 0.7 and less than or equal to 1, greater than or equal to 0.7 and less than or equal to 0.95, greater than or equal to 0.7 and less than or equal to 0.9, greater than or equal to 0.75 and less than or equal to 1, greater than or equal to 0.75 and less than or equal to 0.95, greater than or equal to 0.75 and less than or equal to 0.9, greater than or equal to 0.8 and less than or equal to 1, greater than or equal to 0.8 and less than or equal to 0.95, or even greater than or equal to 0.8 and less than or equal to 0.9, or any and all sub-ranges formed from any of these endpoints.

In embodiments, the SIBS may have a Tan Delta Peak Width greater than or equal to 10° C., greater than or equal to 15° C., or even greater than or equal to 20° C. In embodiments, the SIBS may have a Tan Delta Peak Width less than or equal to 50° C., less than or equal to 40° C., or even less than or equal to 30° C. In embodiments, the SIBS may have a Tan Delta Peak Width greater than or equal to 10° C. and less than or equal to 50° C., greater than or equal to 10° C. and less than or equal to 40° C., greater than or equal to 10° C. and less than or equal to 30° C., greater than or equal to 15° C. and less than or equal to 50° C., greater than or equal to 15° C. and less than or equal to 40° C., greater than or equal to 15° C. and less than or equal to 30° C., greater than or equal to 20° C. and less than or equal to 50° C., greater than or equal to 20° C. and less than or equal to 40° C., or even greater than or equal to 20° C. and less than or equal to 30° C., or any and all sub-ranges formed from any of these endpoints.

In embodiments, the SIBS may have a Shore A Hardness greater than or equal to 20 Shore A, greater than or equal to 30 Shore A, or even greater than or equal to 40 Shore A. In embodiments, the SIBS may have a Shore A hardness less than or equal to 70 Shore A, less than or equal to 60 Shore A, or even less than or equal to 50 Shore A. In embodiments, the SIBS may have a Shore A Hardness greater than or equal to 20 Shore A and less than or equal to 70 Shore A, greater than or equal to 20 Shore A and less than or equal to 60 Shore A, greater than or equal to 20 Shore A and less than or equal to 50 Shore A, greater than or equal to 30 Shore A and less than or equal to 70 Shore A, greater than or equal to 30 Shore A and less than or equal to 60 Shore A, greater than or equal to 30 Shore A and less than or equal to 50 Shore A, greater than or equal to 40 Shore A and less than or equal to 70 Shore A, greater than or equal to 40 Shore A and less than or equal to 60 Shore A, or even greater than or equal to 40 Shore A and less than or equal to 50 Shore A, or any and all sub-ranges formed from any of these endpoints.

In embodiments, the amount of the SIBS in the thermoplastic elastomer blend may be greater than or equal to 10 wt. %, greater than or equal to 15 wt. %, or even greater than or equal to 20 wt. %. In embodiments, the amount of the SIBS in the thermoplastic elastomer blend may be less than or equal to 50 wt. %, less than or equal to 40 wt. %, or even less than or equal to 30 wt. %. In embodiments, the amount of the SIBS in the thermoplastic elastomer blend may be greater than or equal to 10 wt. % and less than or equal to 50 wt. %, greater than or equal to 10 wt. % and less than or equal to 40 wt. %, greater than or equal to 10 wt. % and less than or equal to 30 wt. %, greater than or equal to 15 wt. % and less than or equal to 50 wt. %, greater than or equal to 15 wt. % and less than or equal to 40 wt. %, greater than or equal to 15 wt. % and less than or equal to 30 wt. %, greater than or equal to 20 wt. % and less than or equal to 50 wt. %, greater than or equal to 20 wt. % and less than or equal to 40 wt. %, or even greater than or equal to 20 wt. % and less than or equal to 30 wt. %, or any and all sub-ranges formed from any of these endpoints.

In embodiments, the amount of the SIBS in the thermoplastic elastomer blend may be greater than or equal to 100 pbw, greater than or equal to 125 pbw, or even greater than or equal to 150 pbw. In embodiments, the amount of the SIBS in the thermoplastic elastomer blend may be less than or equal to 200 pbw or even less than or equal to 175 pbw. In embodiments, the amount of the SIBS in the thermoplastic elastomer blend may be greater than or equal to 100 pbw and less than or equal to 200 pbw, greater than or equal 100 pbw and less than or equal to 175 pbw, greater than or equal to 125 pbw and less than or equal to 200 pbw, greater than 125 pbw and less than or equal to 175 pbw, greater than or equal to 150 pbw and less than or equal to 200 pbw, or even greater than or equal to 150 pbw and less than or equal to 175 pbw, or any and all sub-ranges formed from any of these endpoints.

Suitable commercial embodiments of the SIBS are available under the SIBSTAR brand from Kaneka, such as grades 73T, 102T, and 103T.

Styrene-(Ethylene/Propylene)-Styrene Block Copolymer (SEEPS)

In embodiments, the thermoplastic elastomer blend may further comprise a SEEPS. While not wishing to be bound by theory, adding SEEPS to the thermoplastic elastomer blend may help to absorb oil and reduce the hardness of the thermoplastic elastomer blend.

In embodiments, the SEEPS may have a Mw greater than or equal to 100,000 g/mol, greater than or equal to 150,000 g/mol, or even greater than or equal to 200,000 g/mol. In embodiments, the SEEPS may have a Mw less than or equal to $1\times10^6$ g/mol, less than or equal to 750,000 g/mol, or even less than or equal to 500,000 g/mol. In embodiments, the SEEPS may have a Mw greater than or equal to 100,000 g/mol and less than or equal to $1\times10^6$ g/mol, greater than or equal to 100,000 g/mol and less than or equal to 750,000 g/mol, greater than or equal to 100,000 g/mol and less than or equal to 500,000 g/mol, greater than or equal to 150,000 g/mol and less than or equal to $1\times10^6$ g/mol, greater than or equal to 150,000 g/mol and less than or equal to 750,000 g/mol, greater than or equal to 150,000 g/mol and less than or equal to 500,000 g/mol, greater than or equal to 200,000 g/mol and less than or equal to $1\times10^6$ g/mol, greater than or equal to 200,000 g/mol and less than or equal to 750,000 g/mol, or even greater than or equal to 200,000 g/mol and less than or equal to 500,000 g/mol, or any and all sub-ranges formed from any of these endpoints.

In embodiments, the SEEPS may have a Tan Delta Peak Temperature greater than or equal to −60° C., greater than or equal to −50° C., greater than or equal to −25° C., greater than or equal to −10° C., greater than or equal to −5° C., or even greater than or equal to 0° C. In embodiments, the SEEPS may have a Tan Delta Peak Temperature less than or equal to 20° C., less than or equal to 15° C., or even less than or equal to 10° C. In embodiments, the SEEPS may have a Tan Delta Peak Temperature greater than or equal to −60° C. and less than or equal to 20° C., greater than or equal to −60° C. and less than or equal to 15° C., greater than or equal to −60° C. and less than or equal to 10° C., greater than or equal to −50° C. and less than or equal to 20° C., greater than or equal to −50° C. and less than or equal to 15° C., greater than or equal to −50° C. and less than or equal to 10° C., greater than or equal to −25° C. and less than or equal to 20° C., greater than or equal to −25° C. and less than or equal to 15° C., greater than or equal to −25° C. and less than or equal to 10° C., greater than or equal to −10° C. and less than or equal to 20° C., greater than or equal to −10° C. and less than or equal to 15° C., greater than or equal to −10° C. and less than or equal to 10° C., greater than or equal to −5° C. and less than or equal to 20° C., greater than or equal to −5° C. and less than or equal to 15° C., greater than or equal to −5° C. and less than or equal to 10° C., greater than or equal to 0° C. and less than or equal to 20° C., greater than or equal to 0° C. and less than or equal to 15° C., or even greater than or equal to 0° C. and less than or equal to 10° C., or any and all sub-ranges formed from any of these endpoints.

In embodiments, the SEEPS may have a Tan Delta Peak Height greater than or equal to 0.55, greater than or equal to 0.6, greater than or equal to 0.65, greater than or equal to 0.7, greater than or equal to 0.75, or even greater than or equal to 0.8. In embodiments, the SEEPS may have a Tan Delta Peak Height less than or equal to 1, less than or equal to 0.95, or even less than or equal to 0.9. In embodiments, the SEEPS may have a Tan Delta Peak Height greater than or equal to 0.55 and less than or equal to 1, greater than or equal to 0.55 and less than or equal to 0.95, greater than or equal to 0.55 and less than or equal to 0.9, greater than or equal to 0.6 and less than or equal to 1, greater than or equal to 0.6 and less than or equal to 0.95, greater than or equal to 0.6 and less than or equal to 0.9, greater than or equal to 0.65 and less than or equal to 1, greater than or equal to 0.65 and less than or equal to 0.95, greater than or equal to 0.65 and less than or equal to 0.9, greater than or equal to 0.7 and less than or equal to 1, greater than or equal to 0.7 and less than or equal to 0.95, greater than or equal to 0.7 and less than or equal to 0.9, greater than or equal to 0.75 and less than or equal to 1, greater than or equal to 0.75 and less than or equal to 0.95, greater than or equal to 0.75 and less than or equal to 0.9, greater than or equal to 0.8 and less than or equal to 1, greater than or equal to 0.8 and less than or equal to 0.95, or even greater than or equal to 0.8 and less than or equal to 0.9, or any and all sub-ranges formed from any of these endpoints.

In embodiments, the SEEPS may have a Tan Delta Peak Width greater than or equal to 40° C., greater than or equal to 45° C., greater than or equal to 50° C., or even greater than or equal to 55° C. In embodiments the SEEPS may have a Tan Delta Peak Width less than or equal to 100° C., less than or equal to 90° C., or even less than or equal to 80° C. In embodiments, the SEEPS may have a Tan Delta Peak Width greater than or equal to 40° C. and less than or equal to 100° C., greater than or equal to 40° C. and less than or equal to 90° C., greater than or equal to 40° C. and less than or equal to 80° C., greater than or equal to 45° C. and less than or equal to 100° C., greater than or equal to 45° C. and less than or equal to 90° C., greater than or equal to 45° C. and less than or equal to 80° C., greater than or equal to 50° C. and less than or equal to 100° C., greater than or equal to 50° C. and less than or equal to 90° C., greater than or equal to 50° C. and less than or equal to 80° C., greater than or equal to 55° C. and less than or equal to 100° C., greater than or equal to 55° C. and less than or equal to 90° C., or even greater than or equal to 55° C. and less than or equal to 80° C., or any and all sub-ranges formed from any of these endpoints.

In embodiments, the amount of SEEPS in the thermoplastic elastomer blend may be greater than or equal to 1 wt. %, greater than or equal to 3 wt. %, or even greater than or equal to 5 wt. %. In embodiments, the amount of SEEPS in the thermoplastic elastomer blend may be less than or equal to 20 wt. %, less than or equal to 17 wt. %, or even less than or equal to 15 wt. %. In embodiments, the amount of SEEPS in the thermoplastic elastomer blend may be greater than or equal to 1 wt. % and less than or equal to 20 wt. %, greater than or equal to 1 wt. % and less than or equal to 17 wt. %, greater than or equal to 1 wt. % and less than or equal to 15 wt. %, greater than or equal to 3 wt. % and less than or equal to 20 wt. %, greater than or equal to 3 wt. % and less than or equal to 17 wt. %, greater than or equal to 3 wt. % and less than or equal to 15 wt. %, greater than or equal to 5 wt. % and less than or equal to 20 wt. %, greater than or equal to 5 wt. % and less than or equal to 17 wt. %, or even greater than or equal to 5 wt. % and less than or equal to 15 wt. %, or any and all sub-ranges formed from any of these endpoints.

In embodiments, the amount of the SEEPS in the thermoplastic elastomer blend may be greater than or equal to 10 pbw, greater than or equal to 20 pbw, or even greater than or equal to 25 pbw. In embodiments, the amount of the SEEPS in the thermoplastic elastomer blend may be less than or equal to 75 pbw or even less than or equal to 50 pbw. In embodiments, the amount of the SEEPS in the thermoplastic elastomer blend may be greater than or equal to 10 pbw and less than or equal to 75 pbw, greater than or equal to 10 pbw and less than or equal to 50 pbw, greater than or equal to 20 pbw and less than or equal to 75 pbw, greater than or equal to 20 pbw and less than or equal to 50 pbw, greater than or equal to 25 pbw and less than or equal to 75 pbw, or even greater than or equal to 25 pbw and less than or equal to 50 pbw, or any and all sub-ranges formed from these endpoints.

Suitable commercial embodiments of the SEEPS are available under the SEPTON brand from Kuraray Co., Ltd, such as grades 2005 and 4077, along with any other suitable commercial embodiment.

Non-Elastomeric Secondary Polymer

In embodiments, the thermoplastic elastomer blend may further comprise a non-elastomeric secondary polymer. In embodiments, the non-elastomeric secondary polymer may contribute to improved processability or desired physical properties, such as hardness, of the thermoplastic elastomer blend.

In embodiments, the non-elastomeric secondary polymer may comprise polyolefin-based resins. In embodiments, the polyolefin-based resins may include homopolymers, copolymers, blends of polymers, mixtures of polymers, alloys of polymers, or combinations thereof. In embodiments, the polyolefin may include polyethylene (e.g., low-density (LDPE), high-density (HDPE), ultra-high molecular weight (UHDPE), linear-low-density (LLDPE)); maleated polypropylene, polypropylene, polybutylene, polyhexalene, polyoctene, and copolymers thereof; ethylene-vinyl-acetate (EVA) copolymer; or combinations thereof. In embodiments, the non-elastomeric secondary polymer may comprise polyethylene, polypropylene, or combinations thereof.

In embodiments, the non-elastomeric secondary polymer may include polyphenylene ethers (PPE). In embodiments, the PPE may include poly(2,6-dimethyl-1,4-pheylene ether), poly(2,6-diethyl-1,4-phenylene ether), poly(2-methyl-6-ethyl-1,4-phenylene ether), poly(2-methyl-6-propyl-1,4-phenylene ether), poly(2,6-dipropyl-1,4-phenylene ether), poly(2-etyl-6-propyl-1,4-phenylene ether), poly(2,6-dimethoxy-1,4-phenylene ether), poly(2,6-di(chloro methyl)-1,4-pheylene ether), poly(2,6-di(bromo methyl)-1,4-phenylene ether), poly(2,6-diphenyl-1,4-phenylene ether), poly(2,6-ditoluyl-1,4-phenylene ether), poly(2,6-dicholoro-1,4-phenylene ether), poly(2,6-dibenzyl-1,4-phenylene ether), poly (2,5-dimethyl-1,4-phenylene ether), or combinations thereof.

In embodiments, the amount of the non-elastomeric secondary polymer in the thermoplastic elastomer blend may be greater than 0 wt. % or even greater than or equal 1 wt. %. In embodiments, the amount of the non-elastomeric secondary polymer in the thermoplastic elastomer blend may be less than or equal to 15 wt. % or even less than or equal to 10 wt. %. In embodiments, the amount of the non-elastomeric secondary polymer in the thermoplastic elastomer blend may be greater than 0 wt. % and less than or equal to 15 wt. %, greater than 0 wt. % and less than or equal to 10 wt. %, greater than or equal to 1 wt. % and less than or equal to 15 wt. %, or even greater than or equal to 1 wt. % and less than or equal to 10 wt. %, or any and all sub-ranges formed from any of these endpoints.

In embodiments, the amount of the non-elastomeric secondary polymer in the thermoplastic elastomer blend may be greater than or equal to 1 pbw or even greater than or equal to 5 pbw. In embodiments, the amount of the non-elastomeric secondary polymer in the thermoplastic elastomer blend may be less than or equal to 75 pbw or even less than or equal to 50 pbw. In embodiments, the amount of the non-elastomeric secondary polymer in the thermoplastic elastomer blend may be greater than or equal to 1 pbw and less than or equal to 75 pbw, greater than or equal to 1 pbw and less than or equal to 50 pbw, greater than or equal to 5 pbw and less than or equal to 75 pbw, or even greater than or equal to 5 pbw and less than or equal to 50 pbw, or any and all sub-ranges formed from any of these endpoints.

Suitable commercial embodiments of the non-elastomeric secondary polymer are available under the SCLAIR brand from NOVA Chemicals, such as grade 2908; under the PROFAX brand from Lyondellbasell, such as grade 6331; and under the FORMOLENE brand from Formosa Plastics, such as grade 1102, along with any other suitable commercial embodiment.

Plasticizer

In embodiments, the thermoplastic elastomer blend may further comprise a plasticizer. In embodiments, the plasticizer may be used to adjust softness and/or improve flow or other properties of the thermoplastic elastomer blend.

In embodiments, the plasticizer may comprise mineral oil, vegetable oil, synthetic oil, or combinations thereof.

In embodiments the amount of plasticizer in the thermoplastic elastomer blend may be greater than 0 wt. % or even greater than or equal to 5 wt. %. In embodiments the amount of plasticizer in the thermoplastic elastomer blend may be less than or equal to 25 wt. % or even less than or equal to 20 wt. %. In embodiments, the amount of plasticizer in the thermoplastic elastomer blend may be greater than 0 wt. % and less than or equal to 25 wt. %, greater than 0 wt. % and less than or equal to 20 wt. %, greater than or equal to 5 wt. % and less than or equal to 25 wt. %, or even greater than or equal to 5 wt. % and less than or equal to 20 wt. %, or any and all sub-ranges formed from any of these endpoints.

In embodiments, the amount of plasticizer in the thermoplastic elastomer blend may be greater than or equal to 10 pbw or even greater than or equal to 25 pbw. In embodiments, the amount of plasticizer in the thermoplastic elastomer blend may be less than or equal to 100 pbw or even less than or equal to 90 pbw. In embodiments, the amount of plasticizer in the thermoplastic elastomer blend may be greater than or equal to 10 pbw and less than or equal to 100 pbw, greater than or equal to 10 pbw and less than or equal to 90 pbw, greater than or equal to 25 pbw and less than or equal to 100 pbw, or even greater than or equal to 25 pbw and less than or equal to 90 pbw, or any and all sub-ranges formed from any of these endpoints.

Suitable commercial embodiments of the plasticizer are available under PURETOL 380 brand from PETRO-CANADA, and the PRIMOL 382 brand from ExxonMobil, along with any other suitable commercial embodiment.

Filler

In embodiments, the thermoplastic elastomer blend may further comprise a filler. In embodiments, the filler may be used to lower the cost and/or control properties of the thermoplastic elastomer blend. In embodiments, the filler may be used as a mineral filler flame retardant.

In embodiments, the filler may comprise iron oxide, zinc oxide, magnesium oxide, titanium oxide, zirconium oxide, titanium dioxide, alumina, silica, silica-alumina, aluminum hydroxide, magnesium hydroxide, calcium hydroxide, magnesium carbonate, calcium carbonate, barium sulfate, calcium sulfate, sodium sulfate, calcium sulfite, calcium silicate, calcium phosphate, magnesium phosphate, talc, mica, kaolin, clay, wollastonite, hydrotalcite, glass beads, glass powders, silica sand, silica rock, silicon nitride, quartz powder, volcanic pumice, diatomaceous earth, white carbon, iron powder, aluminum powder, or combinations thereof. In embodiments, the filler may comprise calcium carbonate, talc, or combinations thereof.

In embodiments, the amount of filler in the thermoplastic elastomer blend may be greater than 0 wt. % or even greater than or equal to 5 wt. %. In embodiments, the amount of filler in the thermoplastic elastomer blend may be less than or equal to 15 wt. % or even less than or equal to 10 wt. %. In embodiments, the amount of filler in the thermoplastic elastomer blend may be greater than 0 wt. % and less than or equal to 15 wt. %, greater than 0 wt. % and less than or equal to 10 wt. %, greater than or equal to 5 wt. % and less than or equal to 15 wt. %, or even greater than or equal to 5 wt. % and less than or equal to 10 wt. %, or any and all of the sub-ranges formed from any of these endpoints.

In embodiments, the amount of filler in the thermoplastic elastomer blend may be greater than or equal to 10 pbw or even greater than or equal to 25 pbw. In embodiments, the amount of filler in the thermoplastic elastomer blend may be less than or equal to 100 pbw or even less than or equal to 50 pbw. In embodiments, the amount of filler in the thermoplastic elastomer blend may be greater than or equal to 10 pbw and less than or equal to 100 pbw, greater than or equal to 10 pbw and less than or equal to 50 pbw, greater than or equal to 25 pbw and less than or equal to 100 pbw, or even greater than or equal to 25 pbw and less than or equal to 50 pbw, or any and all sub-ranges formed from any of these endpoints.

Additives

In embodiments, the thermoplastic elastomer blend may further comprise at least one additive. In embodiments, the at least one additive may be added in an amount that is sufficient to obtain a desired processing or performance property for the thermoplastic elastomer blend.

In embodiments, the at least one additive may comprise adhesion promoters; biocides; anti-fogging agents; anti-static agents; blowing and foaming agents; bonding agents and bonding polymers; dispersants; flame retardants and smoke suppressants; impact modifiers; initiators; lubricants; micas; pigments, colorants, and dyes; processing aids; release agents; silanes, titanates, and zirconates; slip and anti-blocking agents; stabilisers; stearates; ultraviolet light absorbers; viscosity regulators; waxes; or combinations thereof Foaming Agent In embodiments, the thermoplastic elastomer blend may further comprise a foaming agent. In embodiments, the foaming agent may comprise a physical foaming agent (e.g., carbon dioxide, nitrogen, or air) and/or a chemical foaming agent (e.g., organic or inorganic compounds that release gases upon decomposition). In embodiments, the thermoplastic elastomer blend may be injection molded or extruded into a foamed TPE material. In embodiments, the foaming agent may comprise closed cell foaming agents or open cell blowing agents.

In embodiments a foam formed from the thermoplastic elastomer blend may comprise a density of less than or equal to 0.4 g/cm$^3$ or even less than or equal to 0.3 g/cm$^3$. For a relatively low density foaming process (e.g., less than or equal to 0.4 g/cm$^3$), a large amount of gas may be released and the melt viscosity may be significantly reduced. A crosslink agent, such as peroxide, may be added to the thermoplastic elastomer blend to increase the viscosity. The at least one non-hydrogenated SIS may provide a double bond for the peroxide reaction.

Processing

In embodiments, the thermoplastic elastomer blend described herein may be made with batch process or continuous process.

In embodiments, the components of the thermoplastic elastomer blend may be added all together in an extruder and mixed. In embodiments, mixing may be a continuous process at an elevated temperature (e.g., 380° C.) that is sufficient to melt the polymer matrix. In embodiments, additives may be added at the feed-throat, or by injection or side-feeders downstream. In embodiments, the extruder speed may be greater than or equal to 200 revolutions per minute (rpm) and less than or equal to 700 rpm or even greater than or equal to 300 rpm and less than or equal to 500 rpm. In embodiments, the output from the extruder may be pelletized for later extrusion, molding, thermoforming, foaming, calendaring, and/or other processing into polymeric articles.

Additionally, in some embodiments, the thermoplastic elastomer compounds and/or plastic articles formed therefrom can be at least partially crosslinked, or, in some embodiments, fully crosslinked, by further processing. For example, crosslinking can be performed by chemical crosslinking techniques, electron beam crosslinking techniques, or by irradiation crosslinking techniques, as known to those skilled in the art of thermoplastics polymer engineering.

EXAMPLES

Table 1 below shows sources of ingredients for the thermoplastic elastomer blends of Comparative Examples C1 to C10 and Examples 1 to 8.

TABLE 1

| Ingredient | Brand | Source | Mw (g/mol) | Tan Delta Peak Temperature (° C.) |
|---|---|---|---|---|
| Non-hydrogenated low molecular weight styreneisoprene block copolymer (SIS) | HYBRAR 5127 | Kuraray | 127,000 | 20 |
| Hydrogenated styrenic block copolymer (SIS) having vinyl-polyisoprene soft block | HYBRAR 7125 | Kuraray | 105,000 | −5 |
| Hydrogenated styrenic block copolymer (SIS) having vinyl-polyisoprene soft block | HYBRAR 7135 | Kuraray | 326,000 | 1 |
| High vinylstyrene-ethylene/butylene-styrene block copolymer (SEBS) | KRATON G1641 | Kraton Polymers | 219,000 | −38 |
| High vinylstyrene-ethylene/butylene-styrene block copolymer (SEBS) | KRATON G1642 | Kraton Polymers | 122,000 | −38 |
| High softening point tackifier hydrogenated hydrocarbon resin | PLASTOLYN R1140 (Softening point: 140° C.) | Eastman Chemical | 1,500 | — |
| Styrene-isobutylene-styrene block copolymer (SIBS) | SIBSTAR 103T | Kaneka | 125,000 | 2 |

TABLE 1-continued

| Ingredient | Brand | Source | Mw (g/mol) | Tan Delta Peak Temperature (° C.) |
|---|---|---|---|---|
| Styrene-(ethylene/propylene)-styrene block copolymer (SEEPS) | SEPTON 2005 | Kuraray | 300,000 | −55 |
| Styrene-(ethylene/propylene)-styrene block copolymer (SEEPS) | SEPTON 4077 | Kuraray | 400,000 | −55 |
| High density polyethylene resin | SCLAIR 2908 | NOVA Chemicals | — | — |
| Polypropylene | PROFAX 6331 | Lyondellbasell | — | — |
| Polypropylene | FORMOLENE 1102 | Formosa Plastics | — | — |
| White mineral process oil | 380 vis USP white oil | PETRO-CANADA | — | — |
| Calcium carbonate (limestone) filler | VICRON 25-11 | Specialty Minerals | — | — |

Table 2 below shows the formulations and certain properties of Comparative Examples C1 to C3.

TABLE 2

| | Example | | | | | |
|---|---|---|---|---|---|---|
| | C1 | | C2 | | C3 | |
| Ingredient | Parts | Wt. % | Parts | Wt. % | Parts | Wt. % |
| HYBRAR 5127 | 80 | 48 | 80 | 33 | 80 | 24 |
| SIBSTAR 103T | 0 | 0 | 80 | 33 | 165 | 50 |
| SEPTON 2005 | 55 | 33 | 55 | 22 | 55 | 17 |
| 380 vis USP white oil | 30 | 18 | 30 | 12 | 30 | 9 |
| TOTAL | 165 | 99 | 245 | 100 | 330 | 100 |
| Hardness (Shore A) | 32 | | 37 | | 44 | |
| Tan Delta Peak Temperature (° C.) | 22 | | 25 | | 30 | |
| Tan Delta Peak Height (unitless) | 1.1 | | 0.7 | | 0.6 | |
| Tan Delta Peak Width Span (° C.) | 0 to 50 | | 0 to 60 | | 10 to 60 | |
| Tan Delta Peak Width (° C.) | 50 | | 60 | | 50 | |
| Compression Set (70° C., 22 hours; ASTM D395) | 100 | | 87 | | 87 | |

* Weight percent values are rounded, so totals may not equal 100%.

Comparative Example C1 is representative of a conventional thermoplastic elastomer blend based on HYBRAR 5127. Comparative Examples C2 and C3 differ from Comparative Example C1 in that Comparative Examples C2 and C3 each additionally include SIB STAR 103T. The addition of SIBS causes the Tan Delta Peak Height to decrease from 1.1 for Comparative Example C1 to 0.7 for Comparative Example C2 and 0.6 for Comparative Example C3. This decrease in Tan Delta Peak Height indicates a decrease in damping capacity for Comparative Examples C2 and C3 relative to that for Comparative Example C1. As demonstrated by Comparative Examples C1 to C3, the addition of SIBS to a thermoplastic elastomer blend including non-hydrogenated SIS decreases the damping capacity of the thermoplastic elastomer blend.

Table 3 below shows the formulations and certain properties of Comparative Examples C4 to C6.

TABLE 3

| | Example | | | | | |
|---|---|---|---|---|---|---|
| | C4 | | C5 | | C6 | |
| Ingredient | Parts | Wt. % | Parts | Wt. % | Parts | Wt. % |
| HYBRAR 7135 | 100 | 31 | 100 | 24 | 100 | 15 |
| PLASTOLYN R1140 | 80 | 25 | 80 | 19 | 80 | 12 |
| SIBSTAR 103T | 0 | 0 | 100 | 24 | 325 | 50 |
| SCLAIR 2908 | 35 | 11 | 35 | 8 | 35 | 5 |
| 380 vis USP white oil | 80 | 25 | 80 | 19 | 80 | 12 |
| VICRON 25-11 | 30 | 9 | 30 | 7 | 30 | 5 |
| TOTAL | 325 | 101* | 425 | 101* | 650 | 99* |
| Hardness (Shore A) | 30 | | 29 | | 33 | |
| Tan Delta Peak Temperature (° C.) | 25 | | 26 | | 18 | |
| Tan Delta Peak Height (unitless) | 0.75 | | 0.9 | | 0.95 | |
| Tan Delta Peak Width Span (° C.) | 20 to 60 | | 25 to 65 | | 25 to 65 | |
| Tan Delta Peak Width (° C.) | 40 | | 40 | | 40 | |
| Compression Set (70° C., 22 hours; ASTM D395) | 35 | | 65 | | 64 | |

*Weight percent values are rounded, so totals may not equal 100%.

Comparative Example C4 is representative of a conventional thermoplastic elastomer blend based on HYBRAR 7135. Comparative Examples C5 and C6 differ from Comparative Example C4 in that Comparative Examples C5 and C6 each additionally include SIBSTAR 103T. The addition of SIBS causes the Tan Delta Peak Height to increase from 0.75 for Comparative Example C4 to 0.9 for Comparative Example C5 and 0.95 for Comparative Example C6. This increase in Tan Delta Peak Height indicates an increase in damping capacity for Comparative Examples C5 and C6 relative to that for Comparative Example C4. As demonstrated by Comparative Examples C4 to C6, the addition of SIBS to a thermoplastic elastomer blend including hydrogenated SIS increases the damping capacity of the thermoplastic elastomer blend. However, Comparative Examples C4 and C5 have a Tan Delta Peak Temperature of 25° C. and 26° C., respectively, and may not be suitable for higher temperature applications. Comparative Example C6 has a Tan Delta Peak Temperature of 18° C., below room temperature, and, therefore, may not be suitable for applications at or above room temperature.

Table 4 below shows the formulations and certain properties of Comparative Examples C7 and C8 and Examples 1 and 2.

TABLE 4

| Ingredient | Example | | | | | | | |
|---|---|---|---|---|---|---|---|---|
| | C7 | | C8 | | 1 | | 2 | |
| | Parts | Wt. % | Parts | Wt. % | Parts | Wt. % | Parts | Wt. % |
| HYBRAR 5127 | 0 | 0 | 0 | 0 | 330 | 54 | 165 | 27 |
| HYBRAR 7135 | 100 | 35 | 100 | 16 | 100 | 16 | 100 | 16 |
| PLASTOLYN R1140 | 80 | 28 | 80 | 13 | 80 | 13 | 80 | 13 |
| SIBSTAR 103T | 0 | 0 | 330 | 54 | 0 | 0 | 165 | 27 |
| SCLAIR 2908 | 35 | 12 | 35 | 6 | 35 | 6 | 35 | 6 |
| 380 vis USP white oil | 70 | 25 | 70 | 11 | 70 | 11 | 70 | 11 |
| TOTAL | 285 | 100 | 615 | 100 | 615 | 100 | 615 | 100 |
| Hardness (Shore A) | 35 | | 36 | | 35 | | 35 | |
| Tan Delta Peak Temperature (° C.) | 35 | | 25 | | 42 | | 37 | |
| Tan Delta Peak Height (unitless) | 0.5 | | 0.6 | | 0.95 | | 0.65 | |
| Tan Delta Peak Width Span (° C.) | 5 to 75 | | 25 to 60 | | 10 to 80 | | 5 to 76 | |
| Tan Delta Peak Width (° C.) | 70 | | 35 | | 70 | | 71 | |
| Compression Set (70° C., 22 hours; ASTM D395) | — | | — | | — | | — | |

* Weight percent values are rounded, so totals may not equal 100%.

Comparative Example C7 is representative of a conventional thermoplastic elastomer blend based on HYBRAR 7135. Comparative Example C8 differs from Comparative Example C7 in that Comparative Example C8 additionally includes SIB STAR 103T. The addition of SIBS causes the Tan Delta Peak Height to increase from 0.5 for Comparative Example C7 to 0.6 for Comparative Example C8. However, the addition of SIBS causes the Tan Delta Peak Temperature to decrease from 35° C. for Comparative Example C7 to 25° C. for Comparative Example C8. As such, Comparative Example C8 may not be suitable for certain higher temperature applications. Moreover, the addition of SIBS causes the Tan Delta Peak Width to decrease from 70° C. for Comparative Example C7 to 35° C. for Comparative Example C8, which indicates a significant decrease in damping capacity.

Example 1 differs from Comparative Example C7 in that Example 1 additionally includes HYBRAR 5127. The addition of non-hydrogenated SIS causes the Tan Delta PeakHeight to increase from 0.5 for Comparative Example C7 to 0.95 for Example 1, which indicates a substantial increase in damping capacity. The addition of non-hydrogenated SIS also increases the Tan Delta Peak Temperature from 35° C. for Comparative Example C7 to 42° C. for Example 1. As such, Example 1 may be more suitable for certain higher temperature applications than Comparative Example C7.

Example 2 differs from Comparative Example C8 in that Example 2 additionally includes HYBRAR 5127. The addition of non-hydrogenated SIS causes the Tan Delta PeakHeight to increase from 0.6 for Comparative Example C8 to 0.65 for Example 2 and the Tan Delta Peak Width to increase from 35° C. for Comparative Example C8 to 71° C. for Example 2, which indicate an increase in damping capacity. The addition of non-hydrogenated SIS also increases the Tan Delta Peak Temperature from 25° C. for Comparative Example C8 to 37° C. for Example 2. As such, Example 2 may be more suitable for certain higher temperature applications than Comparative Example C8.

Table 5 below shows the formulations and certain properties of Comparative Examples C9 and C10 and Examples 3 and 4.

TABLE 5

| Ingredient | Example | | | | | | | |
|---|---|---|---|---|---|---|---|---|
| | C9 | | C10 | | 3 | | 4 | |
| | Parts | Wt. % | Parts | Wt. % | Parts | Wt. % | Parts | Wt. % |
| HYBRAR 5127 | 0 | 0 | 0 | 0 | 330 | 55 | 165 | 28 |
| HYBRAR 7125 | 50 | 19 | 50 | 8 | 50 | 8 | 50 | 8 |
| HYBRAR 7135 | 50 | 19 | 50 | 8 | 50 | 8 | 50 | 8 |
| PLASTOLYN R1140 | 80 | 30 | 80 | 13 | 80 | 13 | 80 | 13 |
| SIBSTAR 103T | 0 | 0 | 330 | 55 | 0 | 0 | 165 | 28 |
| SCLAIR 2908 | 35 | 13 | 35 | 6 | 35 | 6 | 35 | 6 |
| 380 vis USP white oil | 50 | 19 | 50 | 8 | 50 | 8 | 50 | 8 |
| TOTAL | 265 | 100 | 595 | 98* | 595 | 98* | 595 | 98* |
| Hardness (Shore A) | 41 | | 38 | | 39 | | 39 | |
| Tan Delta Peak Temperature (° C.) | 41 | | 6 | | 42 | | 42 | |
| Tan Delta Peak Height (unitless) | 0.5 | | 0.55 | | 0.95 | | 0.65 | |

TABLE 5-continued

| Ingredient | Example | | | | | | | |
|---|---|---|---|---|---|---|---|---|
| | C9 | | C10 | | 3 | | 4 | |
| | Parts | Wt. % | Parts | Wt. % | Parts | Wt. % | Parts | Wt. % |
| Tan Delta Peak Width Span (° C.) | 0 to 70 | | 15 to 70 | | 15 to 75 | | 10 to 75 | |
| Tan Delta Peak Width (° C.) | 70 | | 55 | | 60 | | 65 | |
| Compression Set (70° C., 22 hours; ASTM D395) | — | | — | | — | | — | |

*Weight percent values are rounded, so totals may not equal 100%.

Comparative Example C9 is representative of a conventional thermoplastic elastomer blend based on HYBRAR 7125 and HYBRAR 7135. Comparative Example C10 differs from Comparative Example C9 in that Comparative Example C10 additionally includes SIB STAR 103T. The addition of SIBS causes the Tan Delta PeakHeight to increase from 0.5 for Comparative Example C9 to 0.55 for Comparative Example C10, which indicates a slight increase in damping capacity. However, the addition of SIBS causes the Tan Delta Peak Temperature to substantially decrease from 41° C. for Comparative Example C9 to 6° C. for Comparative Example C10. As such, Comparative Example C10 may not be suitable for certain higher temperature applications.

Example 3 differs from Comparative Example C9 in that Example 3 additionally includes HYBRAR 5127. The addition of non-hydrogenated SIS causes the Tan Delta PeakHeight to increase from 0.5 for Comparative Example C9 to 0.95 for Example 3, which indicates a substantial increase in damping capacity. The addition of non-hydrogenated SIS also slightly increases the Tan Delta Peak Temperature from 41° C. for Comparative Example C9 to 42° C. for Example 3.

Example 4 differs from Comparative Example C10 in that Example 4 additionally includes HYBRAR 5127. The addition of non-hydrogenated SIS causes the Tan Delta PeakHeight to increase from 0.55 for Comparative Example C10 to 0.65 for Example 4 and the Tan Delta Peak Width to increase from 55° C. for Comparative Example C10 to 65° C. for Example 4, which indicate a slight increase in damping capacity. The addition of non-hydrogenated SIS also substantially increases the Tan Delta Peak Temperature from 6° C. for Comparative Example C10 to 42° C. for Example 4. As such, Example 4 may be more suitable for certain higher temperature applications than Comparative Example C10.

Table 6 below shows the formulations and certain properties of Examples 5 to 7.

TABLE 6

| Ingredient | Example | | | | | |
|---|---|---|---|---|---|---|
| | 5 | | 6 | | 7 | |
| | Parts | Wt. % | Parts | Wt. % | Parts | Wt. % |
| HYBRAR 5127 | 110 | 35 | 110 | 33 | 110 | 31 |
| HYBRAR 7125 | 65 | 21 | 65 | 20 | 65 | 19 |
| KRATON G1642 | 35 | 11 | 35 | 11 | 35 | 10 |
| PLASTOLYN R1140 | 60 | 19 | 80 | 24 | 100 | 28 |
| PROFAX 6331 | 6 | 2 | 6 | 2 | 6 | 2 |
| 380 vis USP white oil | 35 | 11 | 35 | 11 | 35 | 10 |
| TOTAL | 311 | 99* | 331 | 101* | 351 | 100 |
| Hardness (Shore A) | 27 | | 24 | | 29 | |
| Tan Delta Peak Temperature (° C.) | 40 | | 48 | | 55 | |
| Tan Delta Peak Height (unitless) | 0.95 | | 0.95 | | 0.85 | |
| Tan Delta Peak Width Span (° C.) | 5 to 80 | | 5 to 80 | | 5 to 80 | |
| Tan Delta Peak Width (° C.) | 75 | | 75 | | 75 | |
| Compression Set (70° C., 22 hours; ASTM D395) | — | | — | | — | |

*Weight percent values are rounded, so totals may not equal 100%.

Examples 5 to 7 are thermoplastic elastomer blends as described herein including HYBRAR 5127, HYBRAR 7125, and KRATON G1642. As demonstrated by Examples 5 to 7, blends of non-hydrogenated SIS, hydrogenated SIS, and SEBS have Tan Delta Peak Temperatures above room temperature and, thus, may be more suitable for certain higher temperature applications. The amount of PLASTOLYN R1140 increases from Example 5 to Example 7. As demonstrated, the increase in the amount of tackifier increases the Tan Delta Peak Temperature from 40° C. in Example 5 to 48° C. in Example 6 and to 55° C. in Example 7. While not wishing to be bound by theory, Examples 5 to 7 demonstrate that a thermoplastic elastomer blend with an increased amount of tackifier may be more suitable for certain higher temperature applications.

Table 7 below shows the formulations and certain properties of Examples 8.

TABLE 7

| | Example 8 | |
|---|---|---|
| Ingredient | Parts | Wt. % |
| HYBRAR 5127 | 110 | 25 |
| HYBRAR 7135 | 75 | 17 |
| PLASTOLYN R1140 | 100 | 23 |
| SEPTON 4077 | 25 | 6 |
| FORMOLENE 1102 | 6 | 1 |
| 380 vis USP white oil | 80 | 18 |
| VICRON 25-11 | 40 | 9 |
| TOTAL | 436 | 99* |
| Hardness (Shore A) | 20 | |
| Compound Tan Delta Peak Temperature (° C.) | 26 | |
| Compound Tan Delta Peak Height (unitless) | 0.9 | |
| Compound Tan Delta Peak Width Span (° C.) | 10 to 65 | |
| Tan Delta Peak Width (° C.) | 55 | |
| Compression Set (70° C., 22 hours; ASTM D395) | — | |

*Weight percent values are rounded, so totals may not equal 100%.

Example 8 is a thermoplastic elastomer blend as described herein including HYBRAR 5127, HYBRAR 7135, and SEPTON 4077. As demonstrated by Example 8, blends of non-hydrogenated SIS, hydrogenated SIS, and SEEPS have a Tan Delta Peak Temperature above room temperature and, thus, may be more suitable for certain higher temperature applications.

Table 8 below shows the formulations and certain properties of Comparative Examples C11 and C12 and Examples 9 and 10.

TABLE 8

| | Example | | | | | | | |
|---|---|---|---|---|---|---|---|---|
| | C11 | | C12 | | 9 | | 10 | |
| Ingredient | Parts | Wt. % | Parts | Wt. % | Parts | Wt. % | Parts | Wt. % |
| HYBRAR 5127 | 0 | 0 | 0 | 0 | 330 | 52 | 165 | 26 |
| KRATONG 1641 | 100 | 33 | 100 | 16 | 100 | 16 | 100 | 16 |
| PLASTOLYN R1140 | 100 | 33 | 100 | 16 | 100 | 16 | 100 | 16 |
| SIBSTAR 103T | 0 | 0 | 330 | 52 | 0 | 0 | 165 | 26 |
| SCLAIR 2908 | 35 | 11 | 35 | 6 | 35 | 6 | 35 | 6 |
| 380 vis USP white oil | 70 | 23 | 70 | 11 | 70 | 11 | 70 | 11 |
| TOTAL | 305 | 100 | 635 | 101* | 635 | 101* | 635 | 101* |
| Hardness (Shore A) | 33 | | 36 | | 36 | | 36 | |
| Compound Tan Delta Peak Temperature (° C.) | 42 | | 13 | | 45 | | 43 | |
| Compound Tan Delta Peak Height (unitless) | 0.45 | | 0.8 | | 0.75 | | 0.55 | |
| Compound Tan Delta Peak Width Span (° C.) | 20 to 80 | | 30 to 60 | | 10 to 80 | | 5 to 75 | |
| Compound Tan Delta Peak Width (° C.) | 60 | | 30 | | 70 | | 70 | |
| Compression Set (70° C., 22 hours; ASTM D395) | — | | — | | — | | — | |

*Weight percent values are rounded, so totals may not equal 100%.

Comparative Example C11 is representative of a conventional thermoplastic elastomer blend based on KRATON G1641. Comparative Example C12 differs from Comparative Example C11 in that Comparative Example C12 additionally includes SIB STAR 103T. The addition of SIBS causes the Tan Delta Peak Height to increase from 0.45 for Comparative Example C11 to 0.8 for comparative Example C12. However, the addition of SIB S causes the Tan Delta Peak Width to decrease from 60° C. for Comparative Example C11 to 30° C. for Comparative Example C12, which indicates a decrease in damping capacity. Moreover, the addition of SIBS causes the Tan Delta Peak Temperature to substantially decrease from 42° C. for Comparative Example C11 to 13° C. for Comparative Example C12. As such, Comparative Example C12 may not be suitable for certain higher temperature applications.

Example 9 differs from Comparative Example C11 in that Example 9 additionally includes HYBRAR 5127. The addition of non-hydrogenated SIS causes the Tan Delta PeakHeight to increase from 0.45 for Comparative Example C11 to 0.75 for Example 9 and causes the Tan Delta Peak Width to increase from 60° C. for comparative Example C11 to 70° C. for Example 9, which indicate an increase in damping capacity. Moreover, the addition of non-hydrogenated SIS also slightly increases the Tan Delta Peak Temperature from 42° C. for Comparative Example C11 to 45° C. for Example 9.

Example 10 differs from Comparative Example C12 in that Example 10 additionally includes HYBRAR 5127. The addition of non-hydrogenated SIS increase the Tan Delta Peak Temperature from 13° C. for Comparative Example C12 to 43° C. for Example 10. As such, Example 10 may be more suitable for certain higher temperature applications that Comparative Example C12.

Table 9 shows the formulations and certain properties of Comparative Examples C13 and C14 and Examples 11 and 12.

TABLE 9

| | Example | | | | | | | |
|---|---|---|---|---|---|---|---|---|
| | C13 | | C14 | | 11 | | 12 | |
| Ingredient | Parts | Wt. % | Parts | Wt. % | Parts | Wt. % | Parts | Wt. % |
| HYBRAR 5127 | 0 | 0 | 0 | 0 | 330 | 53 | 165 | 26 |
| KRATON G1642 | 100 | 34 | 100 | 16 | 100 | 16 | 100 | 16 |
| PLASTOLYN R1140 | 100 | 34 | 100 | 16 | 100 | 16 | 100 | 16 |
| SIBSTAR 103T | 0 | 0 | 300 | 53 | 0 | 0 | 165 | 26 |
| SCLAIR 2908 | 35 | 12 | 35 | 6 | 35 | 6 | 35 | 6 |
| 380 vis USP white oil | 60 | 20 | 60 | 10 | 60 | 10 | 60 | 10 |
| TOTAL | 295 | 100 | 595 | 101* | 625 | 101* | 625 | 100 |
| Hardness (Shore A) | 36 | | 36 | | 37 | | 36 | |
| Compound Tan Delta Peak Temperature (° C.) | 35 | | 21 | | 44 | | 35 | |
| Compound Tan Delta Peak Height (unitiess) | 0.85 | | 0.65 | | 0.95 | | 0.6 | |
| Compound Tan Delta Peak Width Span (° C.) | 20 to 75 | | 30 to 65 | | 10 to 80 | | 10 to 80 | |
| Compound Tan Delta Peak Width (° C.) | 55 | | 35 | | 70 | | 70 | |
| Compression Set (70° C., 22 hours; ASTM D395) | — | | — | | — | | — | |

*Weight percent values are rounded, so totals may not equal 100%.

Comparative Example C13 is representative of a conventional thermoplastic elastomer blend based on KRATON G1642. Comparative Example C14 differs from Comparative Example C13 in that Comparative Example C14 additionally includes SIBSTAR 103T. The addition of SIBS causes the Tan Delta Peak Height to decrease from 0.85 for Comparative Example C13 to 0.65 for Comparative Example C14 and the Tan Delta Peak Width to decrease from 55° C. for Comparative Example C13 to 35° C. for Comparative Example C14. As demonstrated by Comparative Examples C13 and C14, the addition of SIBS to a thermoplastic elastomer blend including SEBS decreases the damping capacity of the thermoplastic elastomer blend. Moreover, the addition of SIBS causes the Tan Delta Peak Temperature to substantially decrease from 35° C. for Comparative Example C13 to 21° C. for Comparative Example C14. As such, Comparative Example C14 may not be suitable for certain higher temperature applications.

Example 11 differs from Comparative Example C13 in that Example 11 additionally includes HYBRAR 5127. The addition of non-hydrogenated SIS causes the Tan Delta PeakHeight to increase from 0.85 for Comparative Example C13 to 0.95 for Example 11 and causes the Tan Delta Peak Width to increase from 55° C. for comparative Example C13 to 70° C. for Example 11, which indicate an increase in damping capacity. Moreover, the addition of non-hydrogenated SIS also slightly increases the Tan Delta Peak Temperature from 35° C. for Comparative Example C13 to 44° C. for Example 11. As such, Example 11 may be more suitable for certain higher temperature applications.

Example 12 differs from Comparative Example C14 in that Example 12 additionally includes HYBRAR 5127. The addition of non-hydrogenated SIS increase the Tan Delta Peak Temperature from 21° C. for Comparative Example C14 to 35° C. for Example 12. As such, Example 12 may be more suitable for certain higher temperature applications that Comparative Example C12.

It will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these aspects.

What is claimed is:

1. A thermoplastic elastomer blend comprising:

at least one non-hydrogenated styrene isoprene block copolymer (SIS) having a Weight Average Molecular Weight (Mw) greater than or equal to 50,000 g/mol and a Tan Delta Peak Temperature greater than or equal to 15° C. and less than or equal to 25° C.;

at least one block copolymer selected from the group consisting of:

a hydrogenated SIS having an Mw greater than or equal to 75,000 g/mol and a Tan Delta Peak Temperature less than or equal to 20° C., wherein a ratio by weight of the non- hydrogenated SIS to the hydrogenated SIS is from 1:1 to 4:1; and a styrene-ethylene/butylene-styrene block copolymer (SEBS) having a Mw greater than or equal to 75,000 g/mol and a Tan Delta Peak Temperature less than or equal to 20° C.; and a tackifier having a softening point greater than or equal to 80° C., wherein the at least one non-hydrogenated SIS is present in the thermoplastic elastomer blend in an amount of greater than or equal to 20 wt. % and less than or equal to 75 wt. %; and wherein the tackifier is present in the thermoplastic elastomer blend in an amount of greater than or equal to 1 wt. % and less than or equal to 40 wt. %.

2. The thermoplastic elastomer blend of claim 1, wherein the thermoplastic elastomer blend comprises the hydrogenated SIS.

3. The thermoplastic elastomer blend of claim 1, wherein the thermoplastic elastomer blend comprises the SEBS.

4. The thermoplastic elastomer blend of claim 1, wherein the hydrogenated SIS comprises a polyisoprene soft block; and wherein the polyisoprene soft block is a vinyl-polyisoprene soft block.

5. The thermoplastic elastomer blend of claim 1, wherein the thermoplastic elastomer blend further comprises a styrene-isobutylene styrene block copolymer (SIBS) having a Mw greater than or equal to 50,000 g/mol and a Tan Delta Peak Temperature less than or equal to 20° C.

6. The thermoplastic elastomer blend of claim 1, wherein the thermoplastic elastomer blend further comprises a styrene-(ethylene/propylene)-styrene block copolymer (SEEPS) having a Mw greater than or equal to 100,000 g/mol and a Tan Delta Peak Temperature less than or equal to 20° C.

7. The thermoplastic elastomer blend of claim 1, wherein the Mw of the non-hydrogenated SIS is greater than or equal to 75,000 g/mol; the Mw of the hydrogenated SIS is greater than or equal to 100,000 g/mol; and the Mw of the SEBS is greater than or equal to 100,000 g/mol.

8. The thermoplastic elastomer blend of claim 1, wherein the softening point of the tackifier is greater than or equal to 80° C. and less than or equal to 150° C.

9. The thermoplastic elastomer blend of claim 1, wherein the thermoplastic elastomer blend has a Tan Delta Peak temperature greater than or equal to 20° C.

10. The thermoplastic elastomer blend of claim 1, wherein the thermoplastic elastomer blend has a Tan Delta Peak Height greater than or equal to 0.55; and wherein the thermoplastic elastomer blend has a Tan Delta Peak Width greater than or equal to 55° C.

11. The thermoplastic elastomer blend of claim 1, wherein a ratio by weight of the thermoplastic elastomer blend of the non-hydrogenated SIS to the SEBS is from 1:1 to 4:1.

12. The thermoplastic elastomer blend of claim 1, wherein the hydrogenated SIS is present in the thermoplastic elastomer blend in an amount of greater than or equal to 5 wt. % and less than or equal to 50 wt. %.

13. The thermoplastic elastomer blend of claim 1, wherein the SEBS is present in the thermoplastic elastomer blend in an amount of greater than or equal to 1 wt. % and less than or equal to 20 wt. %.

14. The thermoplastic elastomer blend of claim 1, wherein the hydrogenated SIS is present in the thermoplastic elastomer blend in an amount of greater than or equal to 10 wt. % and less than or equal to 40 wt. %; and the SEBS is present in the thermoplastic elastomer blend in an amount of greater than or equal to 1 wt. % and less than or equal to 20 wt. %.

15. The thermoplastic elastomer blend of claim 1, wherein the thermoplastic elastomer blend further comprises greater than 0 wt. % and less than or equal to 15 wt. % of high density polyethylene, polypropylene, or combinations thereof.

16. The thermoplastic elastomer blend of claim 1, wherein the thermoplastic elastomer blend further comprises greater than 0 wt. % and less than or equal to 25 wt. % of a plasticizer.

17. The thermoplastic elastomer blend of claim 1, wherein the thermoplastic elastomer blend further comprises greater than 0 wt. % and less than or equal to 15 wt. % of a filler.

18. The thermoplastic elastomer blend of claim 1, wherein the non- hydrogenated SIS is cross-linked.

19. A foam comprising the thermoplastic elastomer blend of claim 1, and a foaming agent to form a foam and the foam comprises a density of less than or equal to 0.4 g/cm$^3$.

* * * * *